US012757276B2

(12) United States Patent
Ha et al.

(10) Patent No.: US 12,757,276 B2
(45) Date of Patent: Oct. 6, 2026

(54) ELECTRONIC DEVICE AND METHOD FOR PROVIDING CLOUD-BASED VEHICLE INFORMATION

(71) Applicant: THINKWARE CORPORATION, Seongnam-si (KR)

(72) Inventors: Jungung Ha, Seongnam-si (KR); Donghee Lim, Seongnam-si (KR); Nohyun Song, Seongnam-si (KR); Taekyu Han, Seongnam-si (KR)

(73) Assignee: THINKWARE CORPORATION, Seongnam-si (KR)

(*) Notice: Subject to any disclaimer, the term of this patent is extended or adjusted under 35 U.S.C. 154(b) by 281 days.

(21) Appl. No.: 18/532,326

(22) Filed: Dec. 7, 2023

(65) Prior Publication Data

US 2024/0196462 A1 Jun. 13, 2024

(30) Foreign Application Priority Data

Dec. 9, 2022 (KR) ........................ 10-2022-0171382
Nov. 23, 2023 (KR) ........................ 10-2023-0164900

(51) Int. Cl.

| | |
|---|---|
| ***H04W 76/19*** | (2018.01) |
| ***H04L 41/0803*** | (2022.01) |
| ***H04W 8/18*** | (2009.01) |
| ***H04W 76/16*** | (2018.01) |
| ***H04W 76/38*** | (2018.01) |

(52) U.S. Cl.

CPC ......... *H04W 76/19* (2018.02); *H04L 41/0803* (2013.01); *H04W 8/18* (2013.01); *H04W 76/16* (2018.02); *H04W 76/38* (2018.02)

(58) Field of Classification Search

CPC ....... H04W 76/19; H04W 8/18; H04W 76/16; H04W 76/38; H04L 41/0803

See application file for complete search history.

(56) References Cited

U.S. PATENT DOCUMENTS

2017/0309088 A1* 10/2017 Arya ..................... H04L 67/568
2018/0374009 A1* 12/2018 Hunsaker ................ H04W 4/44
2019/0130671 A1* 5/2019 Dillow ................... G06V 20/20
2019/0310859 A1* 10/2019 Kopfstedt ............. G06F 9/4401
2022/0291012 A1* 9/2022 Park .......................... G06T 7/50
2023/0306800 A1* 9/2023 Konrardy ........... G01C 21/3461

(Continued)

*Primary Examiner* — Sharmin Chowdhury
(74) *Attorney, Agent, or Firm* — WHDA, LLP

(57) ABSTRACT

An electronic device comprises memory storing instructions and including a first memory and a second memory, a sensor, a communication circuit, and a processor. The instructions, when executed by the processor, cause the electronic device to: establish wireless communication connection by using the communication circuit; record in the first memory first sensing information obtained at first timing and transmit, to a server providing a service associated with the vehicle, the recorded first sensing information; recognize that the established wireless communication connection is disconnected after the first timing; record in the first memory second sensing information obtained at second timing while the wireless communication connection is disconnected, and store the recorded second sensing information in the second memory; and transmit, to the server, the stored second sensing information, in response to recognizing that the wireless communication connection is reestablished after the second timing.

20 Claims, 17 Drawing Sheets

(56) References Cited

U.S. PATENT DOCUMENTS

| | | | | |
|---|---|---|---|---|
| 2024/0051484 | A1* | 2/2024 | Matsuoka ................ | G08G 1/16 |
| 2025/0121818 | A1* | 4/2025 | Gutierrez ................. | G06N 5/01 |
| 2025/0227149 | A1* | 7/2025 | Trivedi ..................... | G06F 8/65 |

* cited by examiner

ELECTRONIC DEVICE AND METHOD FOR PROVIDING CLOUD-BASED VEHICLE INFORMATION

CROSS-REFERENCE TO RELATED APPLICATION(S)

This application is based on and claims priority under 35 U.S.C. § 119 to Korean Patent Application No. 10-2022-0171382, filed on Dec. 9, 2022, in the Korean Intellectual Property Office, and Korean Patent Application No. 10-2023-0164900, filed on Nov. 23, 2023, in the Korean Intellectual Property Office, the disclosure of each of which is incorporated by reference herein in its entirety.

BACKGROUND

Technical Field

The disclosure relates to an electronic device and a method for providing cloud-based vehicle information. More particularly, the disclosure relates to a signal flow for providing a cloud service to a user by an in-vehicle device.

Description of Related Art

A vehicle may include an electronic device (or apparatus). For example, the vehicle may be equipped with such an electronic device. For example, the electronic device may include a dashboard camera. For example, the dashboard camera may be referred to as a dashcam, a car digital video recorder (DVR), or a vehicle blackbox.

The dashcam may be disposed in some components (e.g., a compartment) of the vehicle or within the vehicle. For example, the components of the vehicle may include a front face of the vehicle. The dashcam may record an image and a voice. For example, the dashcam may record the image of the inside or the outside of the vehicle. Information (e.g., the image or the voice) obtained from the dashcam may be transmitted to a server through a cellular network. For example, the information may be used to provide a cloud service (or a service).

SUMMARY

According to an embodiment, an electronic device may be connected to a server. The electronic device may establish a communication connection with the server. The electronic device may require a means for storing information to be provided to the electronic device, depending upon a state of the communication connection between the server and the electronic device.

Technical problems to be achieved in the disclosure are not limited to those mentioned above, and other technical problems not mentioned herein may be clearly understood by those having ordinary knowledge in the technical field to which the present invention belongs, from the following description.

An electronic device may comprise memory storing instructions and including a first memory and a second memory. The electronic device may comprise a sensor. The electronic device may comprise a communication circuit. The electronic device may comprise a processor. The instructions may, when executed by the processor, cause the electronic device to establish a wireless communication connection by using the communication circuit. The instructions may, when executed by the processor, cause the electronic device to record in the first memory first sensing information, which is obtained through the sensor at first timing, including an acceleration of a vehicle in which the electronic device is equipped and transmit, to a server providing a service associated with the vehicle, the recorded first sensing information. The instructions may, when executed by the processor, cause the electronic device to recognize that the established wireless communication connection is disconnected after the first timing. The instructions may, when executed by the processor, cause the electronic device to record in the first memory second sensing information, which is obtained through the sensor at second timing, including an acceleration of the vehicle while the wireless communication connection is disconnected, and store the recorded second sensing information in the second memory. The instructions may, when executed by the processor, cause the electronic device to transmit, to the server, the stored second sensing information, in response to recognizing that the wireless communication connection is reestablished after the second timing.

A method performed by an electronic device may comprise establishing a wireless communication connection. The method may comprise recording in a first memory of the electronic device first sensing information, which is obtained at first timing, including an acceleration of a vehicle in which the electronic device is equipped, and transmitting, to a server providing a service associated with the vehicle, the recorded first sensing information. The method may comprise recognizing that the established wireless communication connection is disconnected after the first timing. The method may comprise recording in the first memory second sensing information, which is obtained at second timing, including an acceleration of the vehicle while the wireless communication connection is disconnected, and storing the recorded second sensing information in a second memory of the electronic device. The method may comprise transmitting, to the server, the stored second sensing information, in response to recognizing that the wireless communication connection is reestablished after the second timing.

According to an embodiment, the electronic device may be connected to a server. The electronic device may establish a communication connection with the server. The electronic device may store information to be provided to the electronic device depending upon a state of the communication connection between the server and the electronic device. By providing the server with the stored information, the electronic device may provide a service using the information to a user.

Effects obtainable from the disclosure are not limited to those described above, and other effects not mentioned herein may be clearly understood by those skilled in the art from the following description.

BRIEF DESCRIPTION OF THE DRAWINGS

The above and other aspects, features, and advantages of certain embodiments of the disclosure will be more apparent from the following description, taken in conjunction with the accompanying, in which.

DETAILED DESCRIPTION

Figure 1:
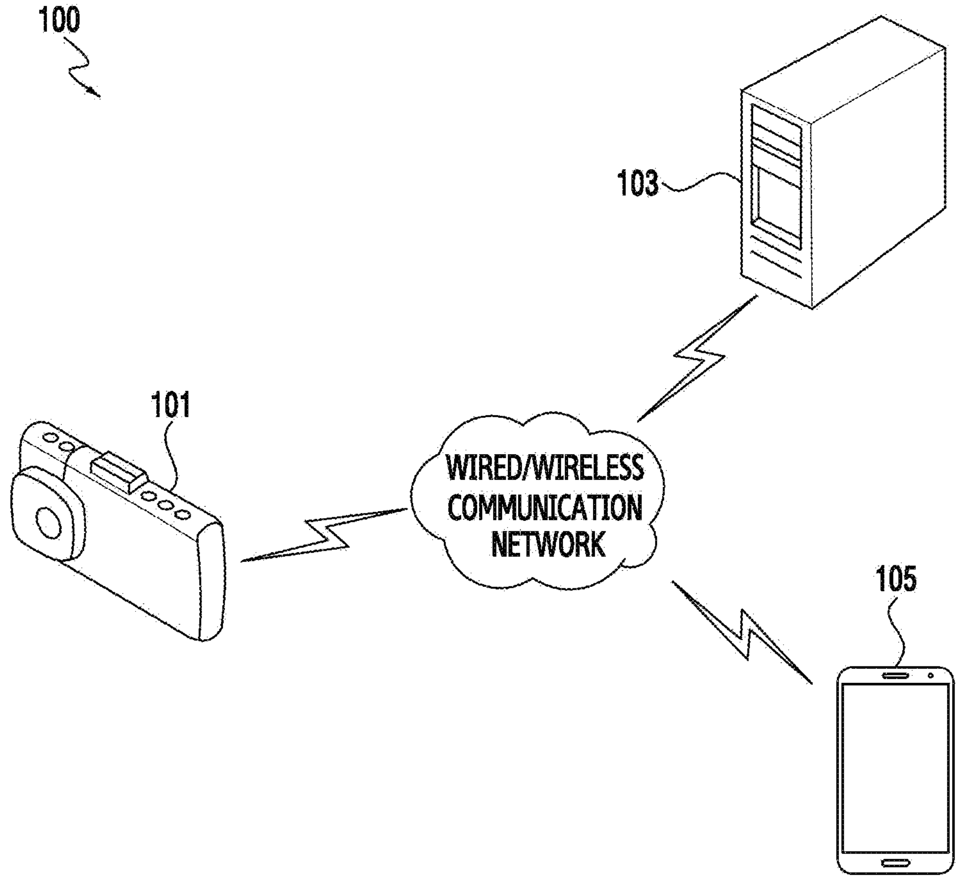
FIG. 1 is a block diagram of an example system for providing a vehicle service, according to an embodiment.

An electronic device according to various embodiments disclosed herein may be one of various types of electronic devices. The electronic devices may include, for example, a portable communication device (e.g., a smartphone), a computer device, a portable multimedia device, a portable medical device, a camera, a wearable device, or a home appliance. The electronic devices (or external electronic devices) according to various embodiments of the present disclosure are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the items, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", or "connected with" another element (e.g., a second element), it means that the element may be coupled with the other element directly (e.g., wiredly), wirelessly, or via a third element.

As used in the present disclosure, the term "module" may include a unit implemented in hardware, software, or firmware, and may be interchangeably used with other terms, for example, "logic", "logic block", "part", or "circuit". A module may be a single integral component, or a minimum unit or part thereof, adapted to perform one or more functions. For example, according to an example, the module may be implemented in a form of an application-specific integrated circuit (ASIC).

Various embodiments of the present disclosure may be implemented as software (e.g., a program) including one or more instructions that are stored in a storage medium that is readable by a machine. For example, a processor of the machine (e.g., an electronic device 101 or a server 103) may invoke at least one of one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Herein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an example, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™ or AppStore™) or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be executed sequentially, in parallel, repeatedly, or heuristically, or one or more of the operations may be executed in a different order or omitted, or one or more other operations may be added.

Hereinafter, various embodiments of the disclosure will be described with reference to the accompanying drawings.

FIG. 1 is a block diagram of an example system for providing a vehicle service, according to an embodiment.

A vehicle of the present disclosure illustrates an example of a moving body, and various embodiments of the disclosure are not limited thereto. For example, the moving body may include a movable object such as a vehicle, a person, a bicycle, a ship, or a train. Hereinafter, for convenience of description, a case where the moving body is a vehicle will be described as an example.

The vehicle service may include at least one of a vehicle black box service, an advanced driver assistance service, a traffic control service, an autonomous vehicle service, a vehicle teleoperated driving system, an artificial intelligence (AI) vehicle control service, or a vehicle to everything (V2X) service. However, embodiments of the disclosure are not limited thereto. For example, the vehicle service may include, for example, an emergency notification service.

Referring to FIG. 1, it is illustrated a system 100 for providing such a vehicle service. For example, the vehicle service providing system (or a vehicle service system) 100 may include at least one of a vehicle black box service system, an advanced driver assistance system (ADAS), a traffic control system, an autonomous vehicle service system, a vehicle teleoperated driving system, an AI vehicle control system, or a V2X service system.

For example, the system 100 may include an electronic device 101, a server 103, and a user terminal device 105. For example, the electronic device 101, the server 103, and the user terminal device 105 may be connected to each other, based on a wired network (or a wired communication network) and/or a wireless network (or a wireless communication network). For example, the connection based on the wired network may be referred to as a wired communication connection. Further, for example, the connection based on the wireless network may be referred to as a wireless communication connection. For example, the electronic device 101 may exchange data with the server 103 and/or the user terminal device 105 using a communication connection (e.g., the wired communication connection and the wireless communication connection).

For example, the electronic device 101 may be controlled based on an input obtained from a user with respect to the user terminal device 105. For example, the input may be input by the user to the user terminal device 105. For example, when the user selects an executable object installed in the user terminal device 105, the electronic device 101 may perform at least one operation corresponding to a control generated by the input to the executable object. For example, the executable object may include an application (or software application) installed in the user terminal device 105 and capable of controlling (or remotely controlling) the electronic device 101.

Figure 2A:
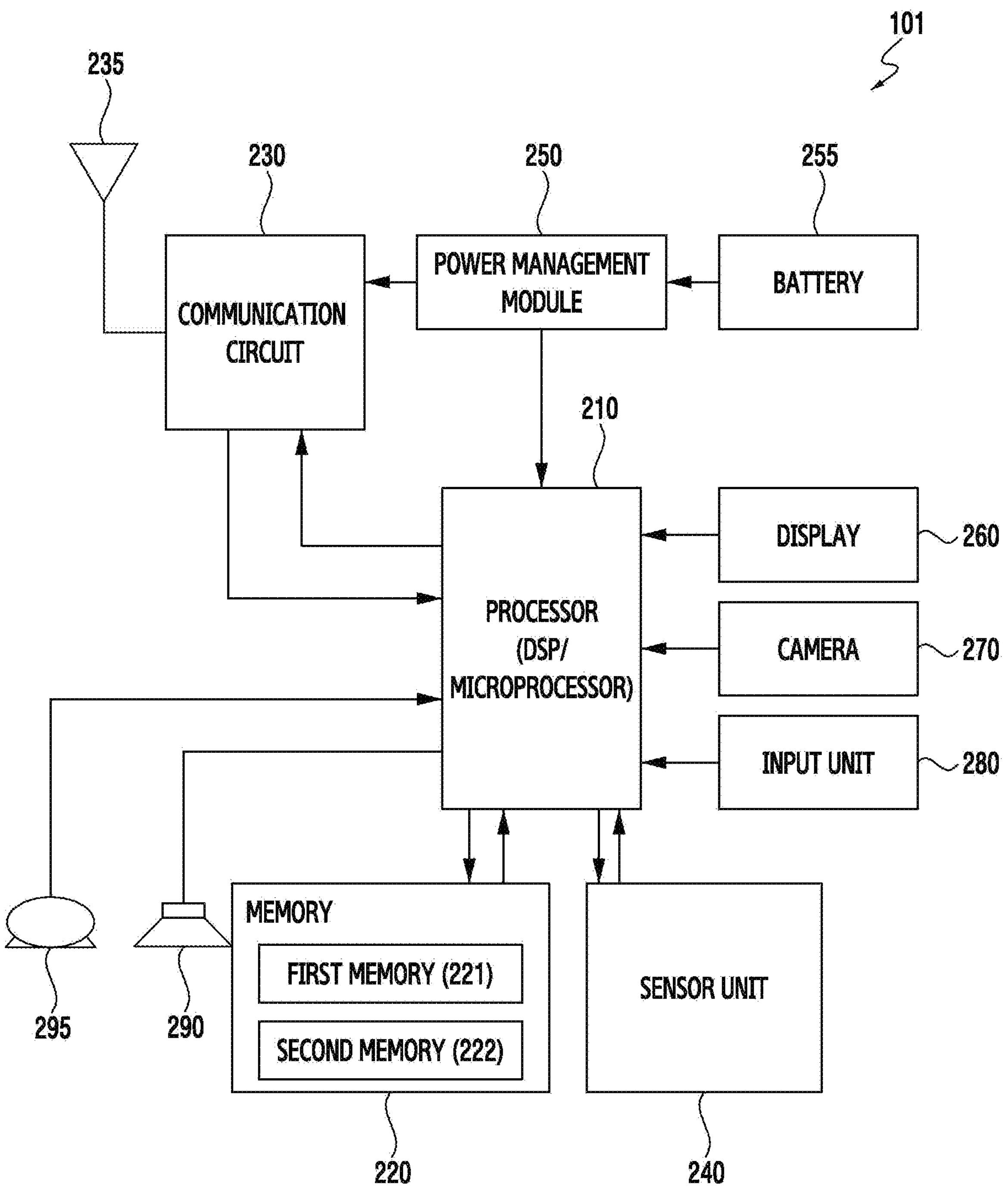
FIG. 2A is a block diagram of an example electronic device according to an embodiment.
Figure 2B:
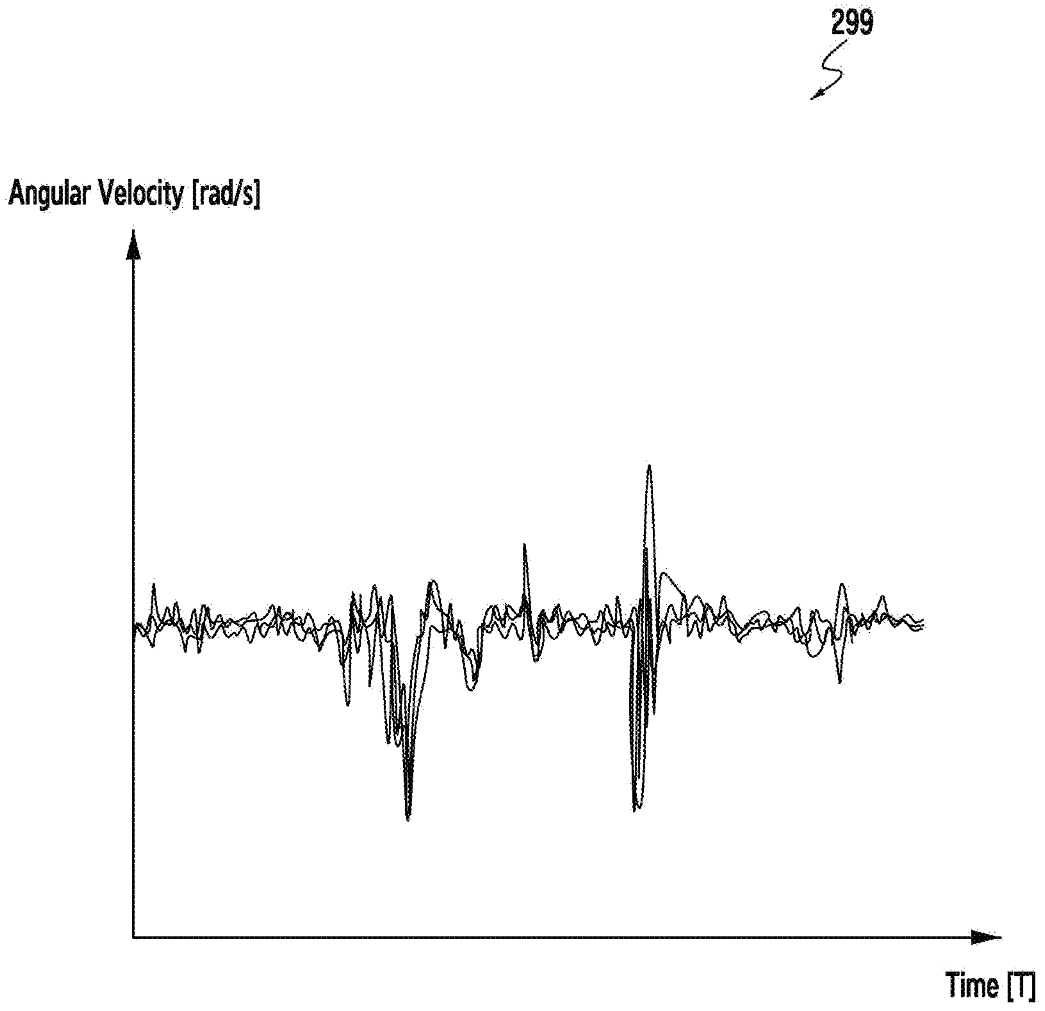
FIG. 2B is a graph representing an example of acceleration acquired by a sensor of an electronic device over time, according to an embodiment.

FIG. 2A is a block diagram of an example electronic device according to an embodiment. FIG. 2B is a graph representing an example of acceleration acquired by a sensor of an electronic device over time, according to an embodiment.

The electronic device 101 of FIG. 2A may illustrate an example of the electronic device 101 of FIG. 1. For example, the electronic device 101 may include a dashcam that may be included or disposed in the vehicle.

Referring to FIG. 2A, the electronic device 101 may include at least one of a processor 210, a memory 220, a communication circuit 230, an antenna 235, a sensor unit 240, a power management module 250, a battery 255, a display 260, a camera 270, an input unit 280, a speaker 290, or a microphone 295. The processor 210, the memory 220, the communication circuit 230, the antenna 235, the sensor unit 240, the power management module 250, the battery 255, the display 260, the camera 270, the input unit 280, the speaker 290, and/or the microphone 295 may be electronically and/or operably coupled with each other by an electronic component such as a communication bus. The type and/or the number of hardware components included in the electronic device 101 are not limited to those illustrated in FIG. 2A. For example, the electronic device 101 may include only some of the hardware components illustrated in FIG. 2A.

The processor 210 may be configured to control the overall operation of the electronic device 101 and implement functions, procedures, and/or methods thereof. The processor 210 may include an application-specific integrated circuit (ASIC), another chipset, a logic circuit, and/or a data processing device. The processor may be an application processor (AP). The processor 110 may include at least one of a digital signal processor (DSP), a central processing unit (CPU), a graphics processing unit (GPU), or a modem (e.g., modulator and demodulator). The number of processors 210 may be one or more. For example, the processor 210 may have a structure of a multi-core processor such as e.g., a dual core, a quad core, or a hexa core.

For example, the processor 210 may control at least some of the memory 220, the communication circuit 230, the antenna 235, the sensor unit 240, the power management module 250, the battery 255, the display 260, the camera 270, the input unit 280, the speaker 290, and the microphone 295. For example, the processor 210 may control to receive data through the communication circuit 230, process the received data, and display the processed data (or a user interface) through the display 260. All or some of the processor 210 may be electrically or operably coupled with or connected to another component in the electronic device 101 (e.g., the memory 220, the communication circuit 230, the antenna 235, the sensor unit 240, the power management module 250, the battery 255, the display 260, the camera 270, the input unit 280, the speaker 290, or the microphone 295). Hereinafter, when the hardware components are operatively coupled with each other, it may mean that a direct connection or an indirect connection between the hardware components is established by wire or wirelessly, such that a second hardware component may be controlled by a first hardware component among those hardware components.

For example, the processor 210 may perform a signal processing function for processing image data obtained by the camera 270 and an image analysis function for obtaining information on the field situation from the image. For example, the signal processing function may include a function of compressing the image data captured by the camera 270 to reduce the size of the video data. The image data may be in the form of multiple frames, each of which is gathered about a time axis. For example, the image data may include photos continuously captured for a given time duration. The size of the image (or the image data) may be very large without compression, and it may be very inefficient to be stored in the memory 220 as it is. Accordingly, the image may be compressed with respect to the digital-converted image. The compression (or video compression) may include a method utilizing a correlation between frames, a spatial correlation, and visual characteristics sensitive to a low-frequency component. Since the original data may be lost in the compression, it may be compressed to a ratio suitable enough to identify a situation of the traffic accident of the vehicle including the electronic device 101. The image or video may be compressed using one of various video codecs, such as, e.g., H.264, MPEG4, H.263, H.265/HEVC, and the like. The image data may be compressed based on a method supported by the electronic device 101.

The image analysis function may operate based on deep learning and may be implemented by a computer vision technique. For example, the image analysis function may include an image division function of dividing an image into several sections or pieces to make a separate inspection of the image, an object detection function of identifying a specific object in the image, an advanced object detection model (e.g., a model of using XY coordinates to generate a boundary box and identifying everything in the boundary box) of recognizing a plurality of objects (e.g., a soccer field, an attacker, a defender, a soccer ball, etc.) present in an image, a facial recognition function of recognizing a human face in an image as well as identifying an individual's identity, a boundary detection function used for identification of an outer boundary of an object or landscape to more accurately grasp the content of an image, a pattern detection function of recognizing a shape or color repeated in an image, or other visual indication, a feature matching function of comparing and classifying similarities of images, or the like.

The image analysis function may be performed on the server 103, rather than on the processor 210 of the electronic device 101.

The memory 220 may include a hardware component for storing data and/or instructions input to and/or output from the processor 210. The memory 220 may include a read-only memory (ROM), a random access memory (RAM), a flash memory, a memory card, a storage medium, and/or another storage device. For example, the memory 220 may include a first memory 221 of a volatile memory and a second memory 222 of a non-volatile memory. For example, the first memory 221 may include at least one of dynamic RAM (DRAM), static RAM (SRAM), cache RAM, or pseudo SRAM (PSRAM). For example, the second memory 222 may include at least one of a programmable ROM (PROM), an erasable PROM (EPROM), an electrically erasable PROM (EEPROM), a flash memory, a hard disk, a compact disk, and an embedded multi-media card (eMMC).

According to an embodiment, one or more instructions (or commands) indicating an arithmetic operation and/or an operation to be performed by the processor 210 on the data may be stored in the memory 220. A set of one or more instructions may be referred to as firmware, operating system, process, routine, sub-routine, and/or application. For example, when a set of a plurality of instructions distributed in the form of operating system, firmware, driver, and/or application is executed, the electronic device 101 and/or the processor 210 may perform at least one of operations of FIGS. 6 to 11, operations of FIG. 14, or operations of FIG. 15. Hereinafter, an application being installed in the electronic device 101 may mean that one or more instructions provided in the form of an application are stored in the memory 220, and thus the one or more applications are stored in an executable format (e.g., a file having an extension designated by the operating system of the electronic device 101) by the processor 210. For example, the application may include a program and/or a library related to a service provided to a user.

The memory 220 may be configured inside the electronic device 101, may be configured removably through a port provided in the electronic device 101, or may exist outside the electronic device 101. When the memory 220 is configured inside the electronic device 101, it may exist in the form of a hard disk drive or a flash memory. When the memory 220 is removably configured in the electronic device 101, the memory 220 may be provided in the form of an SD card, a micro SD card, a USB memory, or the like. When the memory 220 is configured outside the electronic device 101, the memory 220 may be provided in a storage space in another device or a database server through the communication circuit 230.

The communication circuit 230 may be operatively coupled to the processor 210 and may transmit and/or receive a wireless signal. The communication circuit 230 may include a transmitter and a receiver. The communication circuit 230 may include a baseband circuit for processing a radio frequency signal. A transceiver may control the antenna 235 to transmit and/or receive a wireless signal. For example, the antenna 235 may include one or more antenna elements. The communication circuit 230 may be used for the electronic device 101 to communicate with an external electronic device (e.g., the server 103 or the user terminal device 105). For example, the communication circuit 230 may be provided with at least one combination of various known communication modules, such as a cellular mobile communication module, a short-range wireless communication module (e.g., a wireless local area network (WLAN) communication or the like), or a communication module using low-power wide-area (LPWA) technique. For example, the communication circuit 230 may utilize wireless access schemes such as e.g., Global System for Mobile communication (GSM), Code Division Multi Access (CDMA), Long Term Evolution (LTE), 5$^{th}$ Generation (5G), Wireless LAN (WLAN), Wireless-Fidelity (Wi-Fi), Bluetooth™ Radio Frequency Identification (RFID), Infrared Data Association (IrDA), ZigBee, Near Field Communication (NFC), satellite communication or the like. Further, the communication circuit 230 may perform a location tracking function like a Global Positioning System (GPS) tracker. For example, the communication circuit 230 may receive (or obtain) signals provided from multiple satellites. For example, the electronic device 101 may calculate (or obtain or recognize) position information indicating a location of the electronic device 101 based on the signals.

The sensor unit 240 may include one or more sensors. The sensor unit 240 may provide a function of detecting an impact applied to a vehicle or detecting a case in which an amount of change in acceleration is equal to or greater than a predetermined amount. For example, the sensor unit 240 may include image sensors such as high dynamic range cameras. For example, the sensor unit 240 may include non-visual sensors. For example, the sensor unit 240 may include a radar, a light detection and ranging (LiDAR), and/or ultrasonic sensors in addition to the image sensor. For example, the sensor unit 240 may include an acceleration sensor, a geomagnetic sensor, or the like to detect an impact or acceleration.

For example, the one or more sensors may include a movement sensor for a function for detecting a collision of the vehicle by the electronic device 101 (hereinafter, referred to as a collision detection function). For example, the movement sensor may include at least one of the acceleration sensor or a gyroscope sensor. For example, the electronic device 101 may obtain an acceleration value of each of three axes (e.g., x-axis, y-axis, and z-axis) of the electronic device 101 (or the vehicle), using the acceleration sensor. Further, the electronic device 101 may measure a degree (or angle) of tilting in the direction of each of the three axes, using the acceleration sensor. Accordingly, the electronic device 101 may measure a linear acceleration of the electronic device 101 (or the vehicle). For example, the linear acceleration may indicate a rate of change in velocity of an object (or object). For example, the linear acceleration may be used to recognize whether the object is in acceleration, deceleration, or a stopped state. The electronic device 101 may measure the rotational movement of the electronic device 101 (or the vehicle), using the gyroscope sensor. For example, the electronic device 101 may measure an angular velocity of the electronic device 101 (or the vehicle), using the gyroscope sensor.

According to an embodiment, the electronic device 101 may recognize movement of the vehicle, using information (e.g., the linear acceleration and the angular velocity) obtained using the movement sensor. For example, when a magnitude of the gravitational acceleration recognized through the acceleration sensor has a large value (e.g., 256G), the electronic device 101 may recognize that the vehicle is in a state of extreme acceleration or extreme deceleration. Further, for example, the electronic device 101 may recognize a change in the traveling direction of the vehicle, which is recognized through the gyroscope sensor having a dynamic characteristic. A specific example related thereto may be referred to FIG. 2B as below.

FIG. 2B illustrates an example of a graph 299 representing angular velocities over time, measured by the electronic device 101 using the gyroscope sensor. Referring to the graph 299, the electronic device 101 may measure the angular velocity over time, using the gyroscope sensor. The electronic device 101 may recognize a change in the traveling direction of the vehicle, by measuring the amount of change in the angular velocity (or the amount of change in the angular velocity per unit time). For example, as the amount of change in the angular velocity increases, the electronic device 101 may recognize that the amount of change in the traveling direction of the vehicle increases.

For example, the electronic device 101 may detect a collision (or a movement event) occurring with respect to the vehicle, using the one or more sensors other than the movement sensor. For example, the electronic device 101 may include a barometer to detect a change in atmospheric pressure in a cabin of the vehicle, when an airbag is deployed according to the collision. Further, for example, the electronic device 101 may include a thermometer to detect a temperature in the cabin of the vehicle due to occurrence of a fire in the vehicle. Alternatively, for example, the electronic device 101 may include a microphone 295 for detecting the sound of the collision. As described above, the sensors for detecting whether a traffic accident has occurred to the vehicle, by detecting the collision, may be referred to as an accident occurrence detection sensor, an accident occurrence detection device, or an accident occurrence detector.

According to an embodiment, the electronic device 101 may use at least one of a method of detecting whether an accident has occurred by comparing sensing information (or a sensing value) obtained using the accident occurrence detection sensor with a reference value (or a threshold value comparison scheme), or a method of detecting whether an accident has occurred by using an artificial intelligence model trained with the sensing information (or a learning model comparison scheme).

For example, the reference value used in the threshold value comparison method may be a preset value. For example, in case that the threshold value comparison method is used, the electronic device 101 may detect whether an accident has occurred, by comparing the magnitude of acceleration and the amount of change in acceleration of the vehicle measured using the acceleration sensor with the reference value. For example, an example of the threshold value according to the type of sensors of the electronic device 101 may refer to Table 1 below.

TABLE 1

| Sensor | Unit | Threshold Value (Accident Type) |
|---|---|---|
| Acceleration Sensor | G (※ 1.0 G = 9.80 m/s$^2$) | 150 G~200 G or more for 0.2 to 0.4 second (vehicle-vehicle collision or severe crash detection)<br>10 G~30 G (non-severe crash detection)<br>2 G~3 G (vehicle-pedestrian or vehicle-cyclist collision) |
| Gyroscope Sensor | Radians/second | 0.003 rad/sec or more |
| Barometer | Bar | 1 bar~2 bar or more |
| Thermometer | ° C. | More than 70° C. |
| Microphone | dB | 150 dB or more |

Referring to the Table 1 described above, the electronic device 101 may detect an event (or a movement event) occurring with respect to the vehicle based on the sensing information collected using the accident occurrence detection sensor. The electronic device 101 exemplifies one or more threshold values (or threshold ranges) for inferring a degree of severity of the event. The one or more reference values (or reference ranges) are only of an example, and embodiments of the present disclosure are not limited thereto. For example, the electronic device 101 may utilize a plurality of reference values (or a plurality of reference ranges) for comparison of the values obtained through the sensor. The reference value may be changed based on various factors such as a type and a weight of a vehicle to which the electronic device 101 is to be included, a condition of a road on which the vehicle travels, or outside weather.

For example, the movement event may include an event based on a collision (or a crash event) and an event not based on a collision (or a non-crash event). For example, the non-crash event may include an event in which a level of an impact generated by an external factor of the electronic device 101 is a first level. For example, the crash event may include an event in which the level of the impact is a second level exceeding the first level. An example of the kind of the movement event may refer to Table 2 below.

TABLE 2

| Movement Event | Type |
|---|---|
| Non-crash Event | Sudden Acceleration<br>Sudden Deceleration<br>Sudden Departure<br>Sudden Stop<br>Sudden Left Turn<br>Sudden Right Turn<br>Sudden U-Turn |

TABLE 2-continued

| Movement Event | Type |
|---|---|
| Crash Event | Front-Impact<br>Rear-end Collision<br>Side-Impact<br>Rollover |

Referring to Table 2 described above, the non-crash event may include a sudden acceleration, a sudden deceleration, a sudden departure, a sudden stop, and a sudden turn (e.g., a sudden left turn, a sudden right turn, or a sudden U-turn). For example, the non-crash event may be an event that may occur according to driving of the vehicle. Further, the crash event may include a front impact, a rear-end collision, a side impact, or a rollover. For example, the crash event may be an event for identifying occurrence of a severe crash. For example, when the crash event is recognized, the electronic device 101 (or the server 103) may attempt to connect to an emergency call. In other words, the crash event may be a trigger for providing an emergency notification service. The types according to the above-described events in Table 2 are only of an example, and embodiments of the disclosure are not limited thereto.

For example, the artificial intelligence model may be pre-trained, based on data obtained by performing a collision test that may occur in a driving situation using an actual vehicle and a type of crash event classified therefrom. For example, when the learning model comparison scheme is utilized, the electronic device 101 may detect whether an accident has occurred, by learning the magnitude of acceleration and the amount of change measured using the acceleration sensor at the time of impact and non-impact of the vehicle. A detailed example of the electronic device 101 of detecting whether an accident has occurred using the artificial intelligence model will be described below with reference to FIG. 12.

The electronic device 101 may manage electric power for the processor 210 and/or the communication circuit 230 of the electronic device 101, using the power management module 250. For example, the power management module 250 may receive the power from the battery 255 of the electronic device 101. While FIG. 2A illustrates that the power management module 250 is connected to the processor 210 and the communication circuit 230, the embodiments of the disclosure are not limited thereto.

The electronic device 101 may output visualized information to a user, using the display 260 controlled by a controller such as the processor 210. For example, the display 260 may display a captured or still image. For example, the display 260 may display a moving image or a camera preview image. For example, the display 260 may display a graphical user interface (GUI) so as to interact with a user of the electronic device 101. The display 260 may include at least one of a liquid crystal display (LCD), a thin film transistor-liquid crystal display (TFT-LCD), an organic light-emitting diode (OLED), a flexible display, or a three-dimensional (3D) display. The display 260 may be configured with an integrated touch screen by coupling with a sensor capable of receiving a touch input or the like.

The electronic device 101 may capture an image of the surroundings of the vehicle including the electronic device 101 using the camera 270. For example, the electronic device 101 may use the camera 270 to capture an image in at least one of parking, stopping, and driving of the vehicle. The captured image may include a parking lot image, which is a captured image of a parking lot. The parking lot image may include an image captured during a period from a time point when the vehicle enters the parking lot to a time point when the vehicle leaves the parking lot. In other words, the parking lot image may include a video recorded from the timing the vehicle enters the parking lot until the timing the vehicle is parked (e.g., when the vehicle is turned off to park), a video recorded during the parking period of the vehicle, and a video recorded from the time the vehicle finishes the parking (e.g., when the vehicle is turned on to drive out) until the time the vehicle exits the parking lot. The captured image may include at least one of a front side, a rear side, both sides, and an inside of the vehicle. Further, the camera 270 may include an infra-red camera capable of monitoring a face or pupil of the driver.

For example, the camera 270 may include a lens unit and an imaging element. The lens unit may perform a function of collecting optical signals, and the optical signal transmitted through the lens unit reaches an imaging area of the imaging element to form an optical image. Here, the imaging element may include a charge coupled device (CCD), a complementary metal oxide semiconductor image sensor (CIS), or a high-speed image sensor for converting an optical signal into an electrical signal. The camera 270 may further include all or part of a lens unit driver, an aperture, an aperture driver, an imaging element controller, and an image processor.

The operation mode of the electronic device 101 driving the camera 270 may include a constant recording mode, an event recording mode, a manual recording mode, and a parking recording mode. The constant recording mode is a mode that is executed whenever the vehicle is started to drive, and this recording mode may be kept constantly while the vehicle continues to drive. In the constant recording mode, the electronic device 101 may perform recording in a predetermined time unit (e.g., 1 to 5 minutes). Throughout the disclosure the constant recording mode and the constant mode may be used with the same meaning.

The parking recording mode may refer to a mode that operates in a parked state when the vehicle is turned off, or when the battery supply for driving the vehicle is interrupted. In the parking recording mode, the electronic device 101 may operate in a parking constant recording mode in which a recording is performed at all times during parking. Further, in the parking constant recording mode, the electronic device 101 may operate in a parking event recording mode in which a recording is performed when an impact event is detected during parking. In such a case, a video recording of a period of time from a predetermined time point before an event occurs to a predetermined time point after the event occurs (e.g., recording from 10 seconds before to 10 seconds after an event occurs) may be performed. Throughout the disclosure, the parking recording mode and the parking mode may be used with the same meaning.

The event recording mode may refer to a mode that operates when various events occur while the vehicle is driving. The manual recording mode may refer to a mode in which a user manually operates a recording. In the manual recording mode, the electronic device 101 may perform a recording for a period of time from a predetermined time before a user's manual recording request occurs to a predetermined time after the user's manual recording request occurs (e.g., recording for 10 seconds before and after an event occurs)

The electronic device 101 may receive an input to be used by the processor 210 through an input unit 280. The input unit 280 may be displayed on the display 260. The input unit 280 may sense a touch or hovering input of a finger and/or a pen. The input unit 280 may detect an input caused through a rotatable structure or a physical button. The input unit 280 may include sensors for detecting various types of inputs. The input received by the input unit 280 may have various types. For example, the input received by the inputter 280 may include touch and release, drag and drop, long touch, force touch, physical depression, or the like. The input unit 280 may provide the processor 210 with the received input and data related to the received input. In various embodiments, the input unit 280 may include a microphone (or a transducer) capable of receiving a user's voice command. In various embodiments, the input unit 280 may include an image sensor or a camera capable of receiving a user's motion.

The electronic device 101 may output a sound-related result processed by the processor 210, using the speaker 290. For example, the speaker 290 may output audio data indicating that a parking event has occurred. The electronic device 101 may receive a sound-related input to be used by the processor 210, using the microphone 295. The received sound is a sound caused by an external impact or a human voice related to an internal/external situation of the vehicle, and may be used to recognize a surrounding situation at that time together with an image captured by the camera 270. The sound received through the microphone 295 may be stored in the memory 220 (e.g., the second memory 222).

Figure 3:
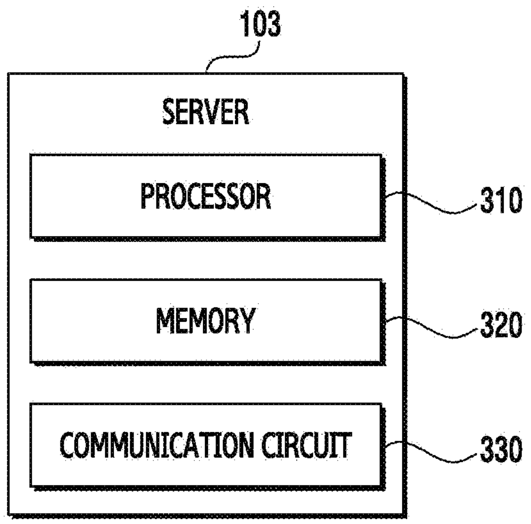
FIG. 3 is an exemplary block diagram of a server, according to an embodiment.

FIG. 3 is a block diagram of an exemplary server according to an embodiment.

The server 103 of FIG. 3 may refer to an example of the server 103 of FIG. 1. For example, the server 103 may include a server that provides a vehicle service. For example, the server 103 may be connected to the electronic device 101 and may provide the vehicle service based on information (or sensing information) received from the electronic device 101.

Referring to FIG. 3, the server 103 may include a processor 310, a memory 320, and a communication circuit 330. The processor 310, the memory 320, and/or the communication circuit 330 may be electrically and/or operably coupled with each other by an electronic component such as a communication bus. The type and/or number of hardware components included in the server 103 are not limited to those illustrated in FIG. 3. For example, the server 103 may include only some of the hardware components illustrated in FIG. 3.

For example, the processor 310 of the server 103 may correspond to the processor 210 of the electronic device 101. For example, the description of the processor 310 may be substantially the same as the description of the processor 210 included in the electronic device 101 of FIG. 2A. Further, the communication circuit 330 of the server 103 may correspond to the communication circuit 230 of the electronic device 101. For example, the description of the communication circuit 330 may be applied in substantially the same manner as that of the communication circuit 230 included in the electronic device 101 of FIG. 2A. For example, the memory 320 of the server 103 may include a hardware component for storing data and/or instructions input to and/or output from the processor 310. The memory 320 may include a read-only memory (ROM), a random access memory (RAM), a flash memory, a memory card, a storage medium, and/or another storage device.

According to an embodiment, one or more instructions (or commands) representing an operation and/or an action to be performed by the processor 310 on data may be stored in the memory 320. A set of one or more instructions may be referred to as firmware, operating system, process, routine, sub-routine, and/or application. For example, when a set of a plurality of instructions distributed in the form of an operating system, firmware, a driver, and/or an application is executed, the server 103 and/or the processor 310 may perform at least one of operations of FIG. 15.

Figure 4:
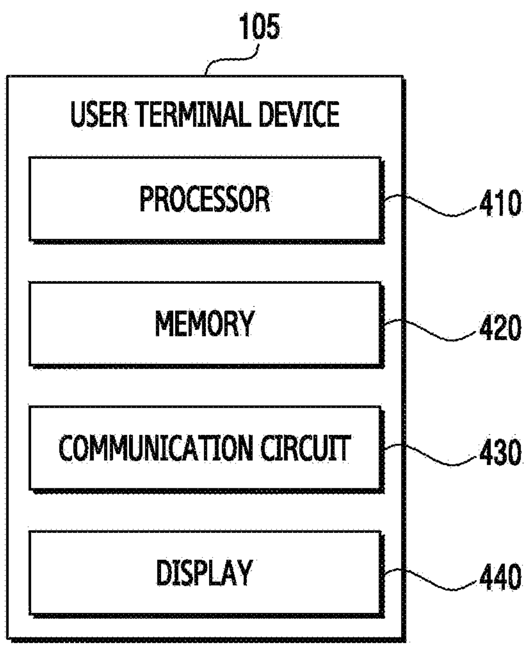
FIG. 4 is a block diagram of an example user terminal device according to an embodiment.

FIG. 4 is a block diagram of an example user terminal device according to an embodiment.

The user terminal device 105 of FIG. 4 may refer to an example of the user terminal device 105 of FIG. 1. For example, the user terminal device 105 may include a server that provides a vehicle service. For example, the user terminal device 105 may be connected to the electronic device 101 and/or the server 103.

Referring to FIG. 4, the user terminal device 105 may include a processor 410, a memory 420, a communication circuit 430, and a display 440. The processor 410, the memory 420, the communication circuit 430, and/or the display 440 may be electrically and/or operably coupled with each other by an electronic component such as a communication bus. The type and/or the number of hardware components included in the user terminal device 105 are not limited to that illustrated in FIG. 4. For example, the user terminal device 105 may include only some of the hardware components illustrated in FIG. 4.

For example, the processor 410 of the user terminal device 105 may correspond to the processor 210 of the electronic device 101. For example, the description of the processor 410 may be substantially the same as the description of the processor 210 included in the electronic device 101 of FIG. 2A. Further, the communication circuit 430 of the user terminal device 105 may correspond to the communication circuit 230 of the electronic device 101. For example, the description of the communication circuit 430 may be applied in substantially the same manner as that of the communication circuit 230 included in the electronic device 101 of FIG. 2A. Further, the display 440 of the user terminal device 105 may correspond to the display 260 of the electronic device 101. For example, the description of the display 440 may be substantially the same as the description of the display 260 included in the electronic device 101 of FIG. 2A.

For example, the memory 420 of the user terminal device 105 may include a hardware component for storing data and/or instructions input to and/or output from the processor 410. The memory 420 may include a read-only memory (ROM), a random access memory (RAM), a flash memory, a memory card, a storage medium, and/or another storage device.

For example, the user terminal device 105 may receive a control message related to the vehicle service from the server 103, and may display a visual object according to the control message through the display 440 in response to the control message.

Figure 5:
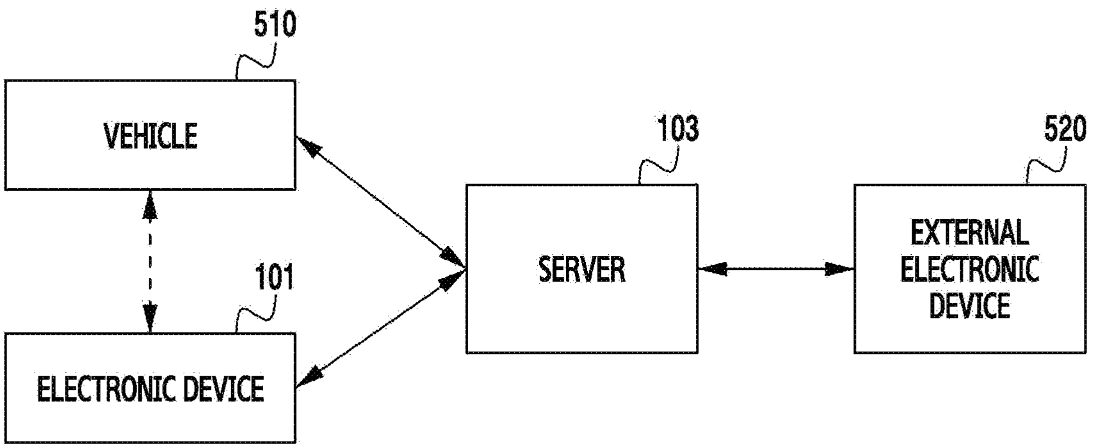
FIG. 5 is a diagram illustrating an example of a method of an electronic device included in a vehicle providing sensing information to a server, according to an embodiment.

FIG. 5 illustrates an example of a method of an electronic device included in a vehicle providing sensing information to a server, according to an embodiment.

The electronic device 101 of FIG. 5 may illustrate an example of the electronic device 101 of FIG. 1. The server 103 of FIG. 5 may represent an example of the server 103 of FIG. 1. The external electronic device 520 of FIG. 5 may represent an example of the user terminal device 105 of FIG. 1. For example, the external electronic device 520 may be an electronic device such as a smartphone. Alternatively, for example, the external electronic device 520 may be a server such as a web.

Referring to FIG. 5, the electronic device 101 may be included in the vehicle 510. For example, the electronic device 101 may be disposed in a certain part of the vehicle 510. For example, the electronic device 101 may be a dashcam disposed in the part of the vehicle 510. The part of the vehicle 510 on which the electronic device 101 is disposed may include a front face of the vehicle 510. However, embodiments of the disclosure are not limited thereto.

Referring to FIG. 5, the electronic device 101 may be indirectly connected to the vehicle 510 via the server 103. For example, the electronic device 101 may establish a wireless communication connection with the server 103. For example, the vehicle 510 may establish a wireless communication connection with the server 103. The server 103 may indicate a server for providing a vehicle service of the vehicle 510. However, embodiments of the disclosure are not limited thereto. For example, the electronic device 101 may establish a wired communication connection or a wireless communication connection with the vehicle 510. For example, a closed-network may be used for the wireless communication connection between the electronic device 101 and the server 103 and between the vehicle 510 and the server 103. For example, the wireless communication connection may be established based on a communication technique such as Wi-Fi, 3G, LTE, or 5G.

According to an embodiment, the electronic device 101 may obtain sensing information. For example, the electronic device 101 may obtain (or collect) an acceleration value of the electronic device 101, using a sensor (e.g., the sensor unit 240 of FIG. 2A). For example, the acceleration value may be referred to as a G sensor value. Further, the electronic device 101 may obtain position information. For example, the electronic device 101 may obtain signals from a plurality of satellites, using a communication circuit (e.g., the communication circuit 230 of FIG. 2A). For example, the electronic device 101 may calculate the position information based on the signals. For example, the position information may be referred to as GPS information. The acceleration value may indicate the acceleration of the vehicle 510. The position information may indicate the location of the vehicle 510.

According to an embodiment, the electronic device 101 may record the obtained sensing information and/or the position information in a memory (e.g., the memory 220 of FIG. 2A). For example, the electronic device 101 may record the sensing information and/or the position information in the first memory 221. The recording may include temporarily storing the information in the first memory 221, which is a volatile memory. The electronic device 101 may transmit the sensing information and/or the position information recorded in the first memory 221 to the server 103. For example, the electronic device 101 may periodically transmit the sensing information and/or the position information recorded in the first memory 221 to the server 103. In this circumstance, the sensing information and/or the position information periodically transmitted to the server may be referred to as constant information (or driving information).

According to an embodiment, the electronic device 101 may detect an event using the sensing information and/or the position information. For example, the event may include a non-crash event and a crash event. For example, the electronic device 101 may recognize a level of the event (e.g., the first level or the second level) and may provide the recognized result to the server 103.

According to an embodiment, the electronic device 101 may obtain an image obtained by photographing a surrounding area of the vehicle 510. For example, the electronic device 101 may acquire an image of the surrounding area using a camera (e.g., the camera 270 of FIG. 2A). For example, the electronic device 101 may provide the image to the server 103. For example, when the crash event is detected, the image may be transmitted to the server 103.

According to an embodiment, the server 103 may provide a vehicle service, using the received sensing information and/or the position information. For example, the server 103 may transmit a message generated based on the sensing information and/or the position information to an external electronic device 520 that controls the vehicle service. For example, the message may be used by the external electronic device 520 to execute a function (such as, e.g., displaying a visual object or an emergency call) for the vehicle service.

Referring to the foregoing description, the electronic device 101 may provide the server 103 with vehicle information (e.g., sensing information, position information, image, or result). In this case, the electronic device 101 may be in a state that the wireless communication connection with the server 103 is established. However, in case that the established wireless communication connection is disconnected in an area (e.g., a mountainous area) with poor communication connectivity, the electronic device 101 may be unable to provide the server 103 with the vehicle information (e.g., sensing information, position information, image, or result) obtained during such disconnection. In other words, the electronic device 101 may record the vehicle information (e.g., sensing information, position information, image, or result) obtained while the wireless communication connection is disconnected, in the first memory 221, and then delete (or remove) the recorded vehicle information (e.g., sensing information, position information, image, or result) from the first memory 221 without transmitting the recorded vehicle information to the server 103. Accordingly, at least part of a set of vehicle information (e.g., sensing information, position information, image, or result) obtained while the vehicle 510 is traveling is lost, and thus, it may be restricted for the server 103 to provide the vehicle service.

Hereinafter, in the disclosure, it is described that the vehicle information (e.g., sensing information, position information, image, or result) obtained (or collected) by the electronic device 101 may be recorded in the first memory 221 of a volatile memory, and the recorded vehicle information (e.g., sensing information, position information, image, or result) may be stored in the second memory 222 in case of recognizing that the establishment of the communication connection is disconnected. Since the second memory 222 is a non-volatile memory, the vehicle information (e.g., sensing information, position information, image, or result) may not be deleted (or removed) over time. Thereafter, when the disconnected communication connection is re-established, the electronic device 101 may sequentially transmit the vehicle information (e.g., sensing information, position information, image, or result) stored in the second memory 222 to the server 103. Accordingly, the server 103 may seamlessly provide the vehicle service. Details related thereto will be described with reference to FIG. 6.

In the above example, it is described an example that the vehicle information (e.g., sensing information, position information, image, or result) is stored in the second memory 222 and transmitted to the server 103, depending upon a state of the wireless communication connection, but embodiments of the disclosure are not limited thereto. For example, according to a state (on/off) of an ignition switch of the electronic device 101, an embodiment of the disclosure may include storing the vehicle information (e.g., sensing information, position information, image, or result) in the second memory 222 and transmitting the vehicle information to the server 103. Details related thereto will be described below with reference to FIGS. 9A and 9B.

Further, according to an embodiment of the disclosure, the electronic device 101 may detect an external impact and recognize an event (e.g., a non-crash event or a crash event) caused by the impact, thereby providing vehicle information (e.g., sensing information, position information, image, or result) to the server 103. Accordingly, the server 103 may provide the vehicle service using the obtained vehicle information (e.g., sensing information, position information, image, or result). Details related thereto will be described below with reference to FIGS. 7 and 8.

Figure 6:
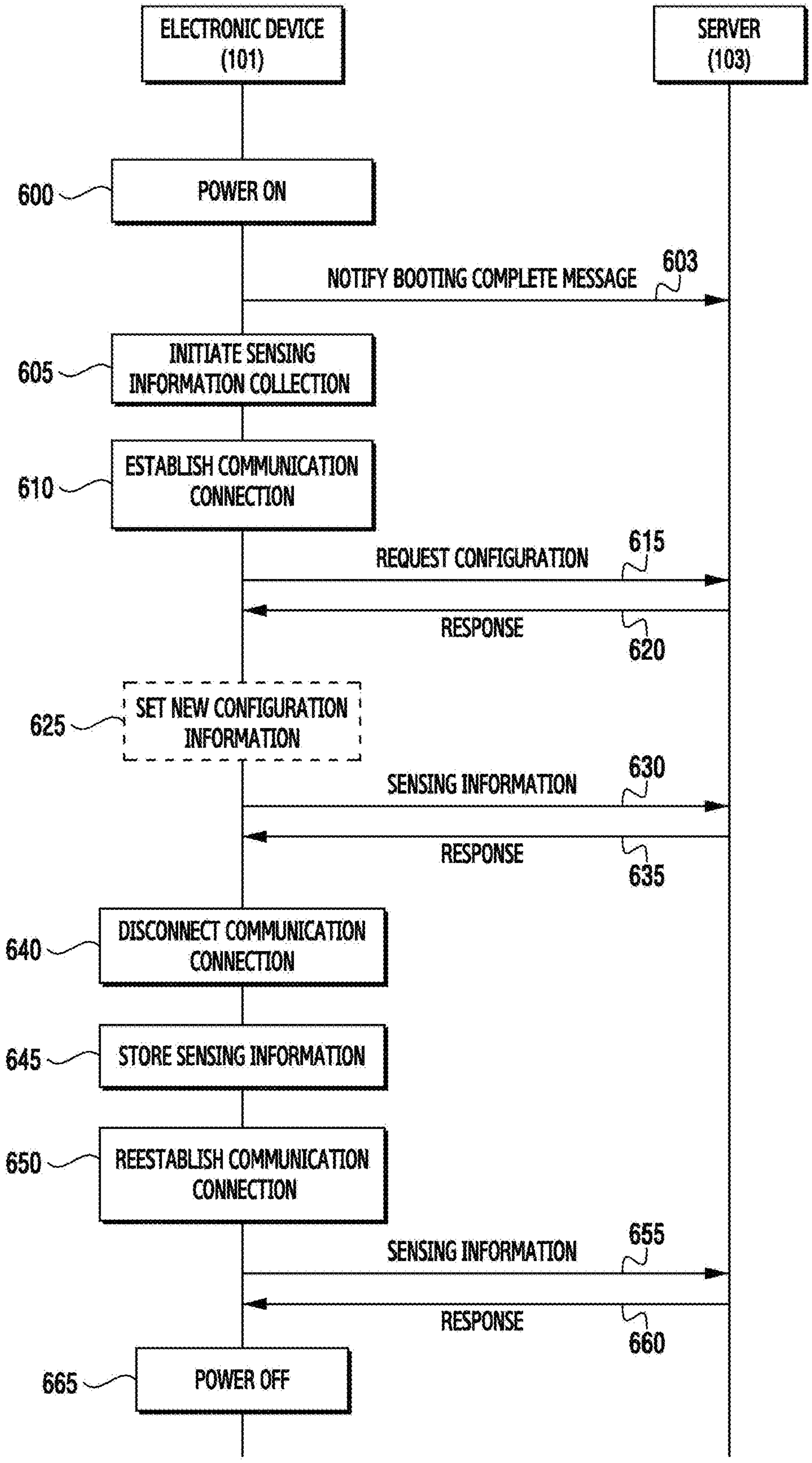
FIG. 6 illustrates an example of a signal flow as to how an electronic device stores obtained sensing information and transmits the stored sensing information based on a state of a communication connection, according to an embodiment.

FIG. 6 illustrates an example of a signal flow for a method of an electronic device storing obtained sensing information and transmitting the stored sensing information, according to a state of communication connection, according to an embodiment.

The electronic device 101 of FIG. 6 may include the electronic device 101 of FIG. 1 and the electronic device 101 of FIG. 2A. The server 103 of FIG. 6 may include the server 103 of FIG. 1 and the server 103 of FIG. 3. At least one of operations of FIG. 6 may be performed by the electronic device 101 or the server 103. For example, at least one of the operations may be controlled by the processor 210 or the processor 310. Each of the operations of FIG. 6 may be performed sequentially, but may be not necessarily performed in sequence. For example, the order of each of the operations may be changed, and at least two operations may be performed in parallel.

According to an embodiment, in operation 600, the electronic device 101 may turn on power. For example, the electronic device 101 may be supplied with power and may turn on the power based on a user input. For example, the electronic device 101 may perform booting after the power is turned on.

According to an embodiment, in operation 603, after the booting is completed, the electronic device 101 may transmit a booting complete message informing the server 103 that the booting is completed. For example, after performing the booting, the electronic device 101 may transmit the booting complete message to the server 103 as it is identified that a normal operation is possible.

According to an embodiment, a configuration request message may include identification information of the electronic device 101 or identification information of a USIM embedded in the electronic device 101.

According to an embodiment, after receiving the booting complete message transmitted in operation 603, the server 103 may identify the electronic device 101 subscribed to the service through the identification information and/or subscriber identification information of the electronic device 101 included in the booting complete message, and may beforehand prepare (or wait for) a procedure for transmitting the sensing information collected from the electronic device 101. For example, resources may be allocated in advance for tasks related to a procedure for establishing a communication connection from the electronic device 101, allocating a storage space for storing sensing information transmitted from the electronic device 101, and so on.

According to an embodiment, in operation 605, the electronic device 101 may initiate collecting of sensing information. For example, the electronic device 101 may collect the sensing information, using an accident occurrence detection sensor (e.g., an acceleration sensor or a gyroscope sensor). For example, the collection may be periodically performed, or may be performed whenever an event (a non-impact event or an impact event) occurs. For example, the sensing information may include an acceleration value.

Although not illustrated in FIG. 6, the electronic device 101 may collect position information together with the sensing information. For example, the electronic device 101 may collect the position information using communication circuitry. For example, the collection may be periodically performed, or may be performed whenever an event (a non-impact event or an impact event) occurs. For example, the position information may include coordinates based on a GPS.

According to an embodiment, in operation 610, the electronic device 101 may establish a communication connection. For example, the electronic device 101 may establish a wireless communication connection with the server 103. For example, the wireless communication connection may be performed based on a wireless communication scheme such as Wi-Fi, 3G, LTE, 5G, or a satellite communication scheme via satellites such as e.g., a Low Earth Orbit (LEO) satellite, a Medium Earth Orbit (MEO) satellite, and a Geostationary Earth Orbit (GEO) satellite. However, embodiments of the disclosure are not limited thereto.

According to an embodiment, in operation 615, the electronic device 101 may transmit a configuration request message to the server 103. For example, after the wireless communication connection is established, the electronic device 101 may transmit the configuration request message to the server 103. For example, the configuration request message may include at least one of identification information of the electronic device 101, identification information of a USIM embedded in the electronic device 101, or firmware information of the electronic device 101. For example, the identification information of the electronic device 101 may include an international mobile equipment identity (IMEI). For example, the identification information of the USIM may include an integrated circuit card identifier (ICCID). For example, the firmware information may include version information of a program booted in the electronic device 101.

In the above-described embodiment, both the operation 603 and the operation 615 describe that the electronic device 101 includes its own identification information and/or subscriber identification information, but the electronic device 101 may include its own identification information and/or subscriber identification information only in a message transmitted in any one of the above two operations.

According to an embodiment, in operation 620, the electronic device 101 may receive a response from the server 103. For example, the response to the configuration request message may be a signal for notifying that the electronic device 101 has been authenticated (or it is recognized that the electronic device 101 is a subscribed device), based on the configuration request message. According to an embodiment, the response to the configuration request message may indicate the server 103 to update the firmware of the electronic device 101, in case that the firmware information included in the configuration request message is not the latest version.

According to an embodiment, the response to the configuration request message may include a configuration environment setting value for the electronic device 101. For example, the configuration environment setting value may include a sensitivity to acceleration measured by a sensor of the electronic device 101, or a length of a transmission period to provide the server 103 with the sensing information including the acceleration. For example, the configuration environment setting value may be also referred to as setting information. For example, an initial value of the configuration information may be stored and distributed within a memory (e.g., SD card) in the electronic device 101, at the time of designing the electronic device 101.

According to an embodiment, in operation 625, the electronic device 101 may configure new configuration information. For example, when the response to the configuration request message includes the new configuration information, the electronic device 101 may perform configuration based on the new configuration information. However, when the response to the configuration request message does not include the new setting information, the operation 625 may be omitted.

According to an embodiment, in operation 630, the electronic device 101 may transmit sensing information to the server 103. For example, the sensing information may indicate the first sensing information from among sets of sensing information that began to collect in the operation 605. While FIG. 6 illustrates an example in which the sensing information is provided to the server 103, the embodiments of the disclosure are not limited thereto. For example, the electronic device 101 may transmit, to the server 103, position information and identification information of the electronic device 101, together with the sensing information. According to an embodiment, in operation 635, the electronic device 101 may receive a response indicating that reception of the first sensing information is completed from the server 103.

In FIG. 6, it is illustrated that in operation 630 the electronic device 101 transmits one piece of sensing information (and position information and identification information) to the server 103, but the embodiments of the disclosure are not limited thereto. For example, the electronic device 101 may, in operation 605, collect the sensing information (and/or position information) based on a collection period, and may transmit the same in order (or sequentially) to the server 103 based on a transmission period within a set of collected sensing information (and/or position information). The collection period may be set to correspond to the transmission period or may be set to be different from the transmission period.

According to an embodiment, the sensing information (and/or the position information) provided from the electronic device 101 to the server 103 may be recorded in the first memory 221 of the electronic device 101. For example, the sensing information (and/or the position information) may be recorded in the first memory 221, which is a volatile memory, and may be provided to the server 103 in response to reaching the transmission period while being recorded.

According to an embodiment, in operation 640, the electronic device 101 may recognize that the communication connection is disconnected. For example, the electronic device 101 may identify disconnection of the wireless communication connection established in operation 610. For example, such disconnection may occur in a situation in which the quality (or strength) of the signal for the wireless communication connection is low, or in an area where it is difficult to provide the wireless communication connection, such as e.g., a mountainous area. However, embodiments of the disclosure are not limited thereto.

According to an embodiment, in operation 645, the electronic device 101 may store sensing information. For example, the electronic device 101 may store, in the second memory 222, a set of sensing information (and/or position information) recorded in the first memory 221. Since the second memory 222 is a non-volatile memory, the set of sensing information (and/or position information) may not be deleted (or removed) over time. For example, the set of sensing information (and/or position information) may be removed when the electronic device 101 transmits the sensing information (and/or position information) to the server 103 or when the recording time has expired.

According to an embodiment, in operation 650, the electronic device 101 may re-establish a communication connection. For example, the electronic device 101 may re-establish the communication connection as the cause of the disconnection is resolved. The conditions under which the cause of the communication disconnection can be resolved may include a situation in which the electronic device 101 gets out of the shaded area of wireless communication, a situation in which the malfunction/disability of the electronic device 101 and/or the server 103 is resolved, and the like.

According to an embodiment, in operation 655, the electronic device 101 may transmit the sensing information to the server 103. In such a circumstance, the sensing information may represent sensing information that is continuous with the sensing information transmitted before the communication connection has been disconnected according to operation 640. While FIG. 6 illustrates an example in which the sensing information is provided to the server 103, the embodiments of the disclosure are not limited thereto. For example, the electronic device 101 may transmit position information and identification information of the electronic device 101, together with the sensing information, to the server 103. According to an embodiment, in operation 660, the electronic device 101 may receive a response indicating that reception of the first sensing information is completed, from the server 103.

According to an embodiment, in operation 665, the electronic device 101 may turn off power. For example, the electronic device 101 may turn on the power based on a user input. However, embodiments of the disclosure are not limited thereto. The operation 665 may be omitted.

Figure 7:
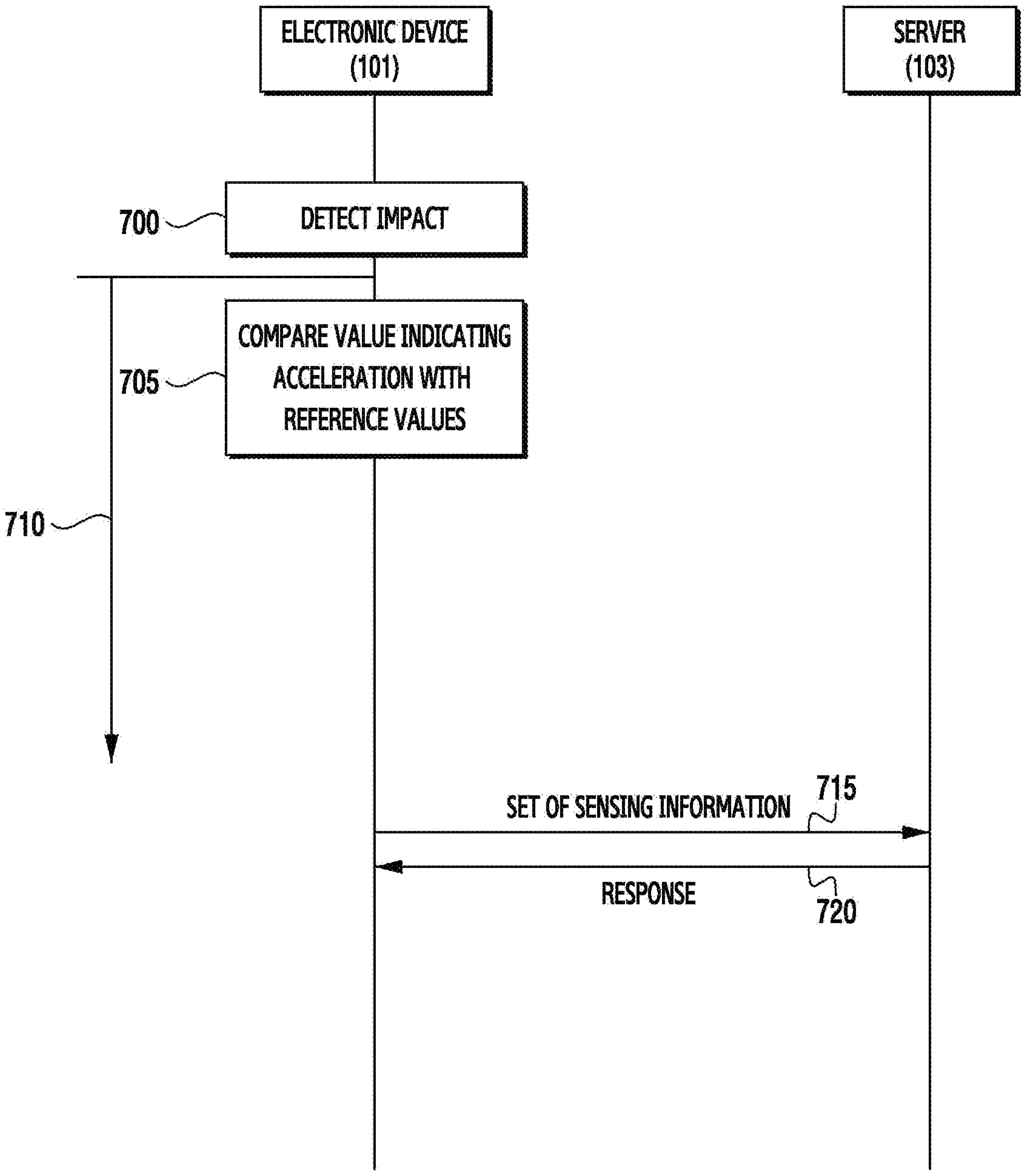
FIGS. 7 and 8 illustrate an example of a signal flow as to how an electronic device transmits the obtained information to a server based on impact detection, according to an embodiment.
Figure 8:
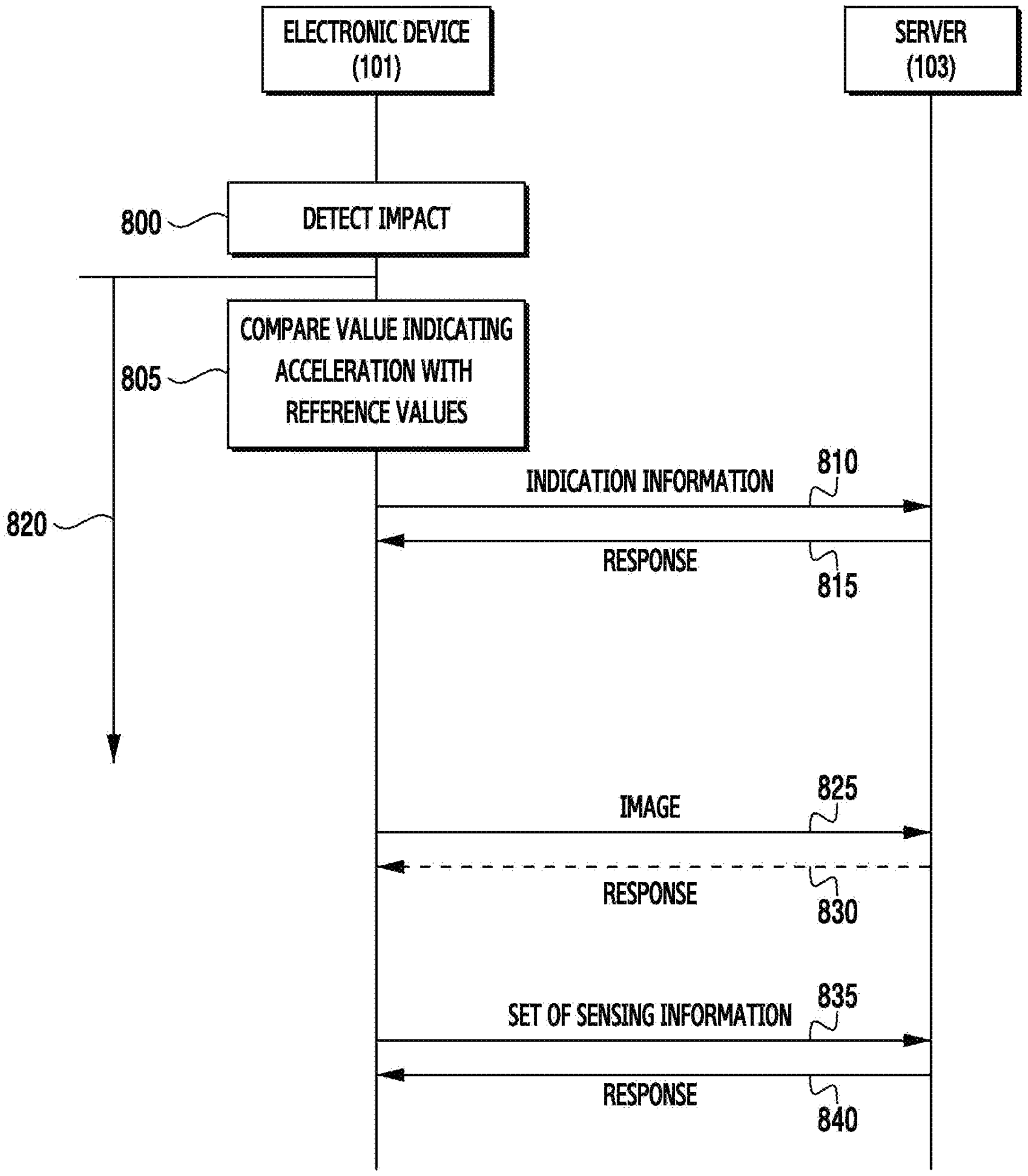

FIGS. 7 and 8 illustrate an example of a signal flow for a method of an electronic device transmitting information obtained based on impact detection to a server, according to an embodiment.

The electronic device 101 of FIGS. 7 and 8 may include the electronic device 101 of FIG. 1 and the electronic device 101 of FIG. 2A. The server 103 of FIGS. 7 and 8 may include the server 103 of FIG. 1 and the server 103 of FIG. 3. At least one of operations of FIG. 7 (or FIG. 8) may be performed by the electronic device 101 or the server 103. For example, at least one of the operations may be controlled by the processor 210 or the processor 310. Each of the operations of FIG. 7 (or operations of FIG. 8) may be performed sequentially, but is not necessarily performed sequentially. For example, the sequence of each of the operations may be changed, and at least two operations thereof may be performed in parallel.

FIGS. 7 and 8 illustrate an example of a method of detecting an impact for a vehicle (e.g., the vehicle 510 of FIG. 5) on which the electronic device 101 is mounted, while the electronic device 101 establishes a communication connection with the server 103, and providing vehicle information (e.g., sensing information, position information, or image) accordingly. For example, FIG. 7 illustrates an example where the event caused by the impact is a non-crash event (or a first level event). Further, for example, FIG. 8 illustrates an example where the event caused by the impact is a crash event (or a second level of event). For example, the operations of FIG. 7 and the operations of FIG. 8 may be performed between the operation 610 and the operation 640 of FIG. 6, or may be performed between the operation 650 and the operation 665.

In an example of FIG. 7, according to an embodiment, in operation 700, the electronic device 101 may detect an impact. For example, the electronic device 101 may detect the impact using an accident occurrence detection sensor. For example, the impact may represent an impact for the vehicle 510 onto which the electronic device 101 is mounted. For example, the electronic device 101 may obtain sensing information at the timing at which the impact is detected, using the accident occurrence detection sensor. For example, the sensing information may include a value indicating acceleration of the vehicle 510. However, embodiments of the disclosure are not limited thereto. For example, the sensing information may further include values obtained by other types of sensors.

According to an embodiment, in operation 705, the electronic device 101 may compare a value indicating the acceleration with preset reference values. For example, the electronic device 101 may compare the value indicating the acceleration with the reference values set for the value indicating the acceleration. For example, the reference values may include a first reference value and a second reference value, the second reference value exceeding the first reference value. For example, when the value indicating the acceleration is less than the first reference value, the electronic device 101 may recognize that the impact does not cause an event. For example, when the value is greater than or equal to the first reference value and less than the second reference value, the electronic device 101 may detect a first level of event (or a non-crash event) based on the impact. Alternatively, for example, when the value is greater than or equal to the second reference value, the electronic device 101 may detect a second level of event (or a crash event) based on the impact. However, embodiments of the disclosure are not limited thereto. For example, the electronic device 101 may compare the value with one reference value, and then it may detect a first level of event based on the impact when the value is less than the reference value, or may detect a second level of event based on the impact when the value is greater than or equal to the reference value. Further, for example, the electronic device 101 may further compare values obtained by other types of sensors with reference values (or reference ranges) for the other types of sensors.

As described above, in the example of FIG. 7, it is assumed an example where the value is greater than or equal to the first reference value and less than the reference value. Accordingly, the electronic device 101 may recognize that the impact detected in operation 700 causes the first level of event. In response to detecting the first level of event, the electronic device 101 may wait for a designated time length 710 from the timing point at which the impact was detected. At this time, such waiting may include that the electronic device 101 collects sensing information for the designated time length 710 and records the collected sensing information in the first memory 221, but does not transmit the recorded sensing information to the server 103. The designated time length 710 may serve as a margin for excluding other shocks that may occur continuously after the shock is detected. For example, the electronic device 101 may refrain from obtaining a value indicating the acceleration at the timing at which the other shock generated from the outside occurred within the designated time length 710.

According to an embodiment, in operation 715, the electronic device 101 may transmit a set of sensing information to the server 103. For example, the electronic device 101 may transmit, to the server 103, a set of the sensing information for a time interval including a designated time length 710 after the timing. According to an embodiment, in operation 720, the electronic device 101 may receive a response to the set of sensing information from the server 103.

In the example of FIG. 7, it is illustrated a case that the electronic device 101 transmits the set of sensing information to the server 103 in operation 715, but the embodiments of the disclosure are not limited thereto. For example, the electronic device 101 may further transmit, to the server 103, at least one of a set of position information, a speed of the vehicle 510 within the time interval, or identification information of the electronic device 101. According to an embodiment, when the electronic device 101 detects the first level of event based on the impact, the electronic device 101 may refrain from providing the image for the time interval to the server 103. For example, the electronic device 101 may not transmit the image to the server 103, even if the image for the time interval is obtained. This may be because the first level of event is an event based on a relatively weak impact that might occur as the vehicle 510 travels.

In an example of FIG. 8, according to an embodiment, in operation 800, the electronic device 101 may detect an impact. For example, the electronic device 101 may detect the impact using an accident occurrence detection sensor. For example, the impact may indicate an impact onto the vehicle 510 in which the electronic device 101 is mounted. For example, the electronic device 101 may obtain sensing information at the timing at which the impact is detected, using the accident occurrence detection sensor. For example, the sensing information may include a value indicating acceleration of the vehicle 510. However, embodiments of the disclosure are not limited thereto. For example, the sensing information may further include values obtained by other types of sensors.

According to an embodiment, in operation 805, the electronic device 101 may compare a value indicating acceleration with reference values. As described above, in the example of FIG. 8, it is assumed an example that the value is equal to or greater than the second reference value. Accordingly, the electronic device 101 may recognize that the impact detected in operation 800 causes the second level of event. In response to detecting the second level of event, the electronic device 101 may wait for a designated time length 820 from the timing at which the impact was detected. At this time, such waiting may include that the electronic device 101 collects sensing information for a designated time length 820 and records the collected sensing information in the first memory 221, but does not transmit the recorded sensing information to the server 103. The designated time length 820 may include a margin for excluding other impacts that might occur continuously after the impact is detected.

According to an embodiment, in operation 810, the electronic device 101 may transmit indication information to the server 103. For example, in response to detecting the second level of event in operation 805, the electronic device 101 may transmit, to the server 103, the indication information informing that the second level of event has occurred.

According to an embodiment, the indication information may include identification information of the electronic device 101 and time information at which the impact has been detected in the operation 800. For example, the time information may include a date and a time (e.g., hours, minutes, and seconds).

According to an embodiment, in operation 815, the electronic device 101 may receive a response to the indication information from the server 103. For example, the response to the indication information may be a signal to notify that the server 103 has recognized the indication information.

According to an embodiment, in operation 825, the electronic device 101 may transmit an image to the server 103. For example, in operation 800, the electronic device 101 may obtain the image for a time interval including a timing at which the impact is detected and a designated time length 820. For example, the electronic device 101 may transmit, to the server 103, the image obtained for the time interval at another timing at which the designated time length 820 has passed from the timing.

According to an embodiment, in operation 830, the electronic device 101 may receive a response to the image from the server 103. For example, the response to the image may be a signal for notifying that the server 103 has recognized the image. However, embodiments of the disclosure are not limited thereto. For example, the operation 830 may be omitted.

According to an embodiment, in operation 835, the electronic device 101 may transmit a set of sensing information to the server 103. For example, the electronic device 101 may transmit the set of sensing information for the time interval to the server 103. According to an embodiment, in operation 840, the electronic device 101 may receive a response to the set of sensing information from the server 103.

In the example of FIG. 8, it is illustrated that in operation 835 the electronic device 101 transmits the set of sensing information to the server 103, but the embodiment of the disclosure is not limited thereto. For example, the electronic device 101 may further transmit, to the server 103, at least one of a set of position information, a speed of the vehicle 510 within the time interval, or identification information of the electronic device 101.

Figure 9A:
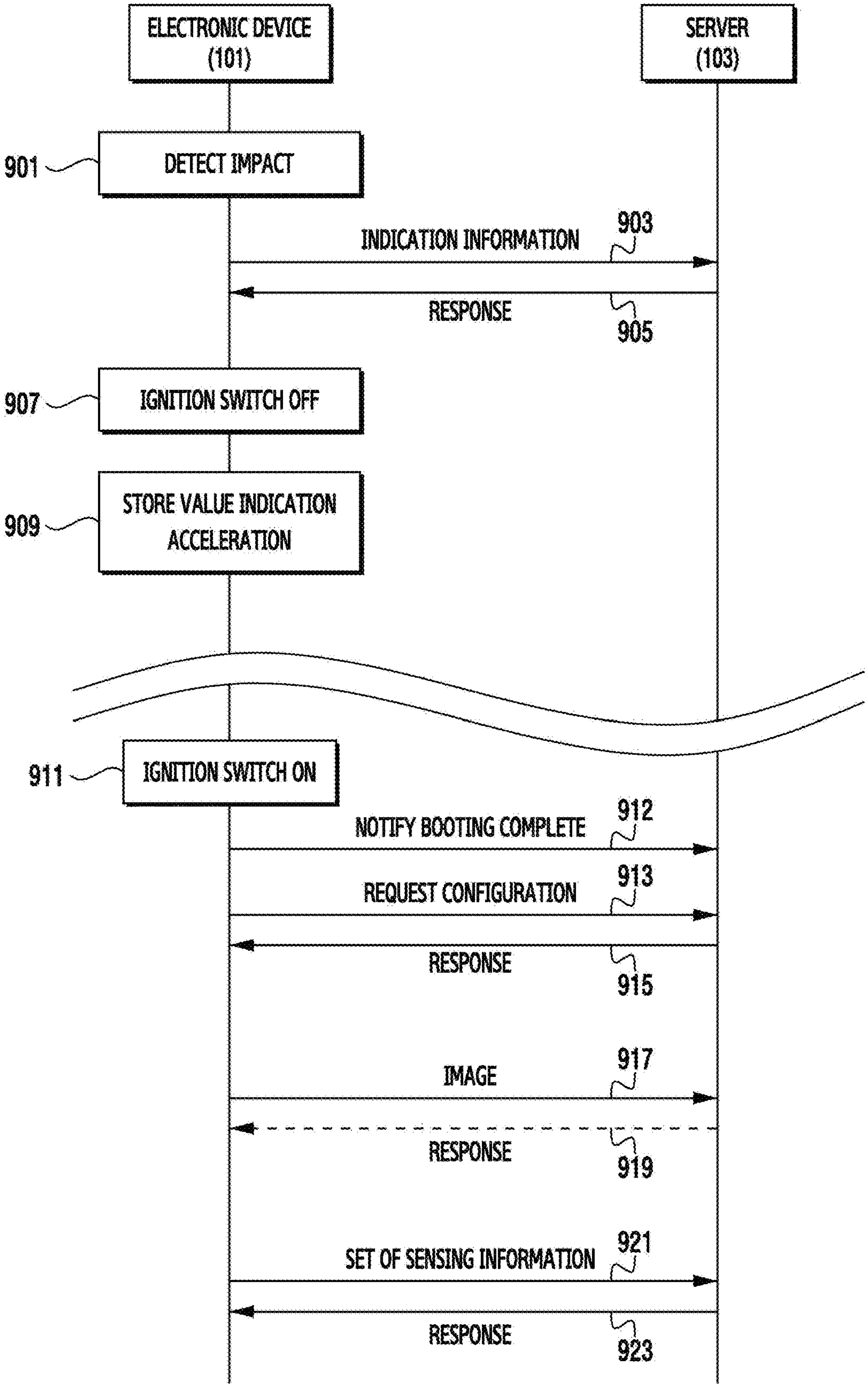
FIGS. 9A and 9B illustrate an example of a signal flow as to how an electronic device stores information obtained based on a state of an ignition switch after the impact detection and transmits the stored information to a server, according to an embodiment.
Figure 9B:
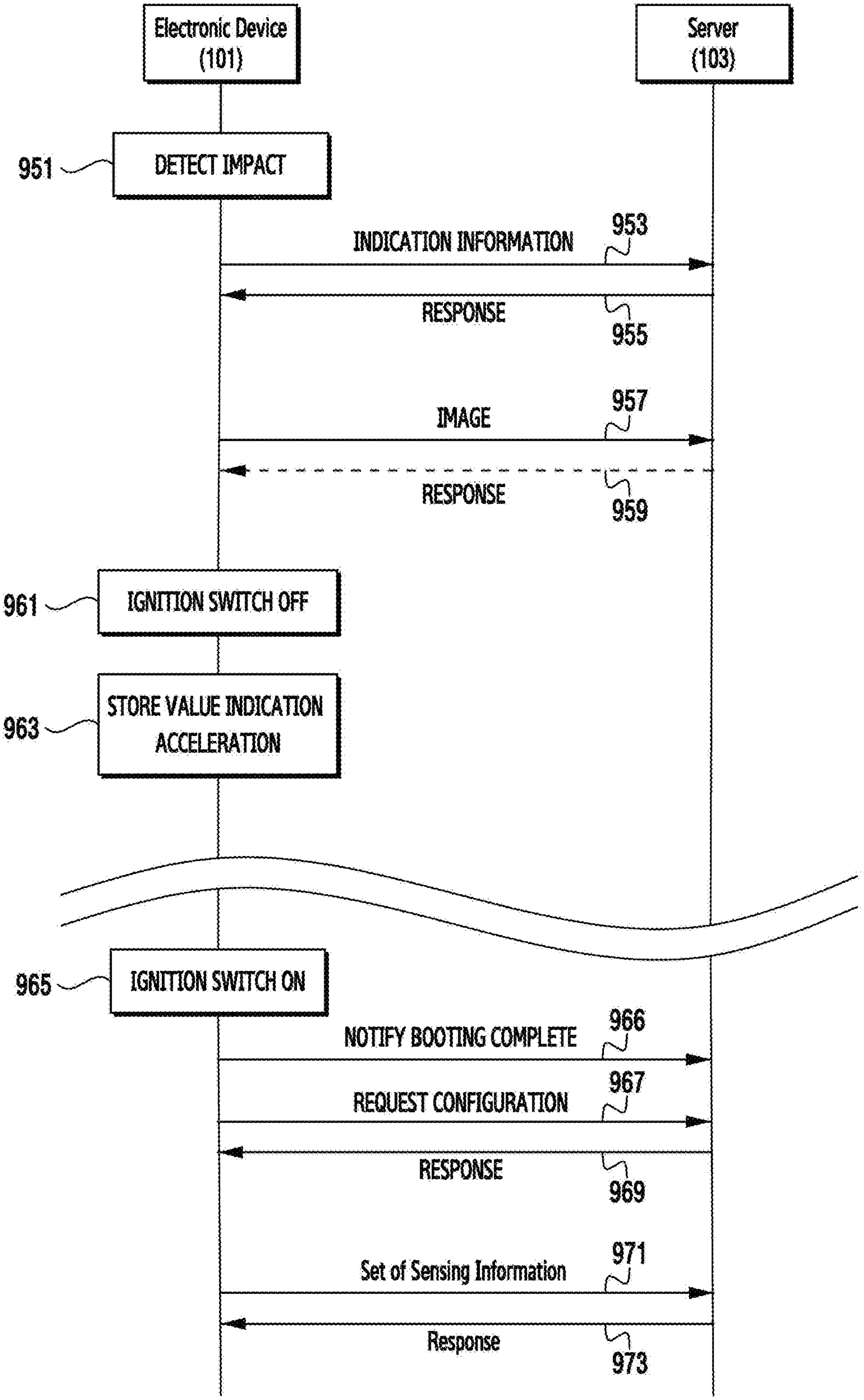

FIGS. 9A and 9B illustrate an example of a signal flow for a method of an electronic device storing information obtained depending upon a state of an ignition switch after detection of an impact and transmitting the stored information to a server, according to an embodiment.

The electronic device 101 of FIGS. 9A and 9B may include the electronic device 101 of FIG. 1 and the electronic device 101 of FIG. 2A. The server 103 of FIGS. 9A and 9B may include the server 103 of FIG. 1 and the server 103 of FIG. 3. At least one of operations of FIG. 9A (or FIG. 9B) may be performed by the electronic device 101 or the server 103. For example, at least one of the operations may be controlled by the processor 210 or the processor 310. Each of the operations of FIG. 9A (or the operations of FIG. 9B) may be performed sequentially, but is not necessarily performed sequentially. For example, the sequence of each of the operations may be changed, and at least two operations thereof may be performed in parallel.

FIGS. 9A and 9B, unlike FIG. 6, illustrate an example of an operation in which the electronic device 101 stores information recorded in the first memory 221 in the second memory 222 and transmits the stored information to the server 103, in response to detecting that the state of the ignition switch of the electronic device 101 changes (e.g., changing from ON to OFF or from OFF to ON), rather than the wireless communication connection being disconnected.

In the example of FIG. 9A, according to an embodiment, in operation 901, the electronic device 101 may detect an impact. For example, the electronic device 101 may detect the impact using an accident occurrence detection sensor. For example, the impact may indicate an impact onto the vehicle 510 in which the electronic device 101 is mounted. For example, the electronic device 101 may obtain sensing information at the timing at which the impact is detected, using the accident occurrence detection sensor. For example, the sensing information may include a value indicating acceleration of the vehicle 510. However, embodiments of the disclosure are not limited thereto. For example, the sensing information may further include values obtained by other types of sensors.

According to an embodiment, the electronic device 101 may compare a value indicating acceleration with reference values. In the example of FIG. 9A, it is assumed an example that the value is equal to or greater than the second reference value. Accordingly, the electronic device 101 may recognize that the impact detected in operation 901 causes the second level of event.

According to an embodiment, in operation 903, the electronic device 101 may transmit indication information to the server 103. For example, in response to detecting the second level of event in operation 901, the electronic device 101 may transmit, to the server 103, the indication information informing the server that the second level of event has occurred. According to an embodiment, the indication information may include identification information of the electronic device 101 and/or time information at which the impact was detected in the operation 901. For example, the time information may include a date and a time (e.g., hours, minutes, and seconds).

According to an embodiment, in operation 905, the electronic device 101 may receive a response to the indication information from the server 103. For example, the response to the indication information may be a signal to notify that the server 103 has recognized the indication information.

According to an embodiment, in operation 907, the electronic device 101 may recognize that the ignition switch is off. For example, the electronic device 101 may recognize that the ignition switch is turned off according to an external factor.

According to an embodiment, in operation 909, the electronic device 101 may store a value indicating acceleration. For example, the electronic device 101 may store a value (or sensing information) indicating the acceleration, which is obtained using the accident occurrence detection sensor, in the second memory 222. In this case, the value (or sensing information) indicating the acceleration may be recorded in the first memory 221 as it is collected. In the above example, it is illustrated an example of storing the value (or sensing information) indicating the acceleration, but embodiments of the disclosure are not limited thereto. For example, the electronic device 101 may store position information in the second memory 222 together with the value indicating the acceleration.

In FIG. 9A, it is illustrated that the operation 909 is performed subsequent to the operation 907, but embodiments of the disclosure are not limited thereto. For example, the electronic device 101 may perform the operation 907 and the operation 909 together.

According to an embodiment, in operation 911, the electronic device 101 may recognize that the ignition switch is turned on. For example, the electronic device 101 may recognize that the ignition switch is turned on as the external factor is resolved.

According to an embodiment, in operation 912, the electronic device 101 may transmit a booting complete message for informing the server 103 that the booting has been completed. For example, the electronic device 101 may perform the booting after operation 911. For example, after performing the booting, the electronic device 101 may transmit the booting complete message to the server 103, in response to identifying that a normal operation is possible.

According to an embodiment, the configuration request message may include identification information of the electronic device 101 or identification information of a USIM embedded in the electronic device 101.

According to an embodiment, after receiving the booting complete message transmitted in operation 912, the server 103 may identify the electronic device 101 subscribed to the service through the identification information and/or subscriber identification information of the electronic device 101 included in the booting complete message, and may beforehand prepare (or wait for) a procedure for transmitting the sensing information collected from the electronic device 101. For example, resources related to tasks for a procedure of establishing communication connection from the electronic device 101, allocating a storage space for storing the sensing information transmitted from the electronic device 101, and the like may be allocated in advance.

According to an embodiment, in operation 913, the electronic device 101 may transmit a configuration request message to the server 103. After the operation 912, as the communication connection is established, the electronic device 101 may transmit the configuration request message to the server 103. For more detailed information related thereto, the operation 615 of FIG. 6 may be referred to. According to an embodiment, in operation 915, the electronic device 101 may receive a response to the configuration request message. For more detailed information related thereto, the operation 620 of FIG. 6 may be referred to.

According to an embodiment, in operation 917, the electronic device 101 may transmit an image to the server 103. For example, in operation 901, the electronic device 101 may obtain the image for a time interval including a timing at which the impact was detected and a designated time length. For example, the electronic device 101 may transmit to the server 103 the image obtained for the time interval at another timing at which the designated time length has elapsed from the timing.

According to an embodiment, in operation 919, the electronic device 101 may receive a response to the image from the server 103. For example, the response to the image may be a signal for notifying that the server 103 has recognized the image. However, embodiments of the disclosure are not limited thereto. For example, the operation 919 may be omitted.

According to an embodiment, in operation 921, the electronic device 101 may transmit a set of sensing information to the server 103. For example, the electronic device 101 may transmit the set of sensing information for the time interval to the server 103. According to an embodiment, in operation 923, the electronic device 101 may receive a response to the set of sensing information from the server 103.

In the example of FIG. 9A, it is illustrated that the electronic device 101 transmits the set of sensing information to the server 103 in operation 921, but the embodiments of the disclosure are not limited thereto. For example, the electronic device 101 may further transmit to the server 103 at least one of a set of position information, a speed of the vehicle 510 within the time interval, or identification information of the electronic device 101.

In the example of FIG. 9B, according to an embodiment, in operation 951, the electronic device 101 may detect an impact. For example, the electronic device 101 may detect the impact using an accident occurrence detection sensor. For example, the impact may indicate an impact onto the vehicle 510 in which the electronic device 101 is mounted. For example, the electronic device 101 may obtain sensing information at the timing at which the impact is detected, using the accident occurrence detection sensor. For example, the sensing information may include a value indicating acceleration of the vehicle 510. However, embodiments of the disclosure are not limited thereto. For example, the sensing information may further include values obtained by other types of sensors.

According to an embodiment, the electronic device 101 may compare a value indicating acceleration with reference values. In the example of FIG. 9B, it is assumed an example that the value is equal to or greater than the second reference value. Accordingly, the electronic device 101 may recognize that the impact detected in operation 951 causes the second level of event.

According to an embodiment, in operation 953, the electronic device 101 may transmit indication information to the server 103. For example, in response to detecting the second level of event in operation 951, the electronic device 101 may transmit, to the server 103, the indication information informing the server 103 that the second level of event has occurred. According to an embodiment, the indication information may include identification information of the electronic device 101 and time information at which the impact was detected in operation 951. For example, the time information may include a date and a time (e.g., hours, minutes, and seconds).

According to an embodiment, in operation 955, the electronic device 101 may receive a response to the indication information from the server 103. For example, the response to the indication information may include a signal for notifying that the server 103 has recognized the indication information.

According to an embodiment, in operation 957, the electronic device 101 may transmit an image to the server 103. For example, in operation 951, the electronic device 101 may obtain the image for a time interval including a timing at which the impact is detected and a designated time length. For example, the electronic device 101 may transmit to the server 103 the image obtained for the time interval at another timing at which a designated time length has elapsed from the timing.

According to an embodiment, in operation 959, the electronic device 101 may receive a response to the image from the server 103. For example, the response to the image may include a signal for notifying that the server 103 has recognized the image. However, embodiments of the disclosure are not limited thereto. For example, the operation 959 may be omitted.

According to an embodiment, in operation 961, the electronic device 101 may recognize that the ignition switch is turned off. For example, the electronic device 101 may recognize that the ignition switch is turned off according to an external factor.

According to an embodiment, in operation 963, the electronic device 101 may store a value indicating acceleration. For example, the electronic device 101 may store a value (or sensing information) indicating the acceleration, which is obtained using the accident occurrence detection sensor, in the second memory 222. In this case, the value (or sensing information) indicating the acceleration may be in a state recorded in the first memory 221 as it is collected. In the above example, it is illustrated an example of storing the value (or sensing information) indicating the acceleration, but embodiments of the disclosure are not limited thereto. For example, the electronic device 101 may store position information in the second memory 222, together with the value indicating the acceleration.

In FIG. 9B, the operation 963 is illustrated as being performed after the operation 961, but embodiments of the disclosure are not limited thereto. For example, the electronic device 101 may perform the operation 961 and the operation 963 together.

According to an embodiment, in operation 965, the electronic device 101 may recognize that the ignition switch is turned on. For example, the electronic device 101 may recognize that the ignition switch is turned on as the external factor is resolved.

According to an embodiment, in operation 966, the electronic device 101 may transmit a booting complete message informing the server 103 that a booting is completed. For example, the electronic device 101 may perform the booting after the operation 965. For example, after performing the booting, the electronic device 101 may transmit the booting complete message to the server 103, in response to identifying that a normal operation is possible.

According to an embodiment, the configuration request message may include identification information of the electronic device 101 or identification information of a USIM embedded in the electronic device 101.

According to an embodiment, after receiving the booting complete message transmitted in the operation 966, the server 103 may identify the electronic device 101 subscribed to the service through the identification information and/or subscriber identification information of the electronic device 101 included in the booting complete message, and may prepare (or wait for) in advance a procedure for transmitting the sensing information collected from the electronic device 101. For example, resources related to tasks for a procedure of establishing a communication connection from the electronic device 101, allocating a storage space for storing sensing information transmitted from the electronic device 101, and the like may be allocated in advance.

According to an embodiment, in operation 967, the electronic device 101 may transmit a configuration request message to the server 103. After the operation 966, as the communication connection is established, the electronic device 101 may transmit the configuration request message to the server 103. For more detailed information related thereto, the operation 615 of FIG. 6 may be referred to. According to an embodiment, in operation 969, the electronic device 101 may receive a response to the configuration request message. For more detailed information related thereto, the operation 620 of FIG. 6 may be referred to.

According to an embodiment, in operation 971, the electronic device 101 may transmit a set of sensing information to the server 103. For example, the electronic device 101 may transmit the set of sensing information for the time interval to the server 103. According to an embodiment, in operation 973, the electronic device 101 may receive a response to the set of sensing information from the server 103.

In the example of FIG. 9B, it is illustrated that the electronic device 101 transmits the set of sensing information to the server 103 in the operation 971, but embodiments of the disclosure are not limited thereto. For example, the electronic device 101 may further transmit to the server 103 at least one of a set of position information, a speed of the vehicle 510 within the time interval, or identification information of the electronic device 101.

Figure 10:
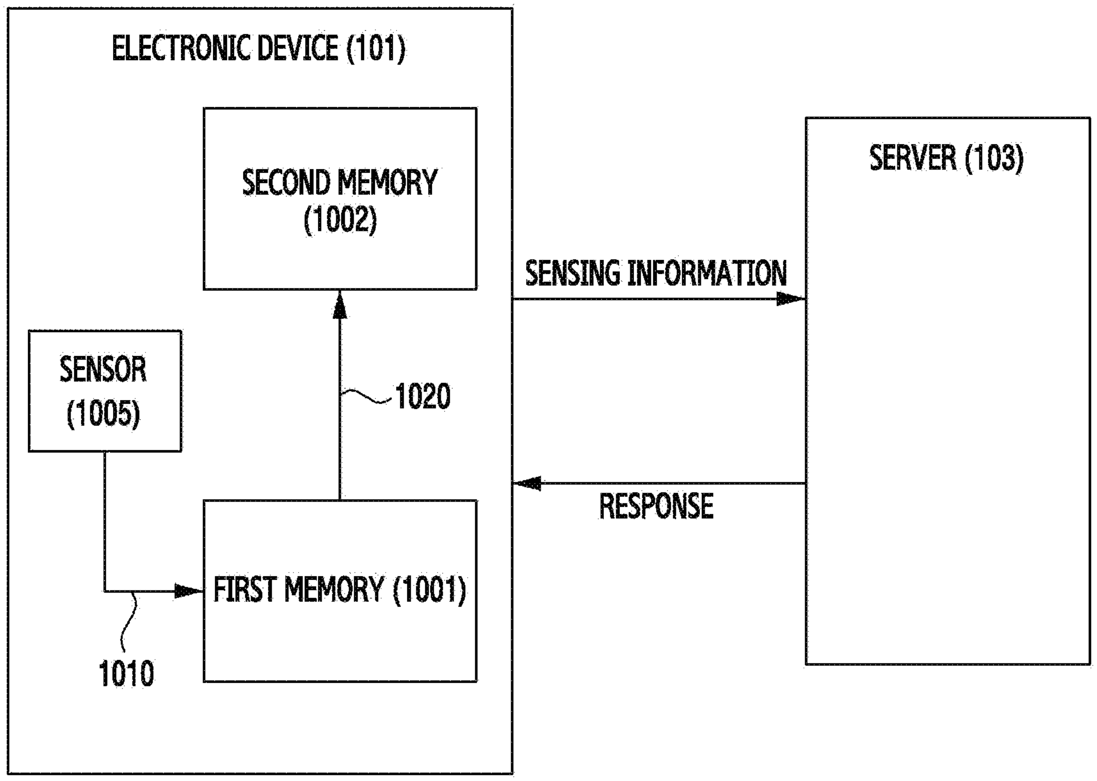
FIG. 10 illustrates an example of a signal flow as to how an electronic device records the obtained sensing information in a first memory and stores the same in a second memory, according to an embodiment.

FIG. 10 illustrates an example of a method of an electronic device recording obtained sensing information in a first memory and storing the obtained sensing information in a second memory, according to an embodiment.

The electronic device 101 of FIG. 10 may illustrate an example of the electronic device 101 of FIG. 1. For example, the sensor 1005 of FIG. 10 may be an example of the sensor unit 240 of the electronic device 101 of FIG. 2A. A first memory 1001 of FIG. 10 may be an example of the first memory 221 of the electronic device 101 of FIG. 2A. A second memory 1002 of FIG. 10 may be an example of the second memory 222 of the electronic device 101 of FIG. 2A. The server 103 of FIG. 10 may represent an example of the server 103 of FIG. 1.

Referring to FIG. 10, the electronic device 101 may obtain sensing information using a sensor 1005. For example, the electronic device 101 may periodically obtain the sensing information using the sensor 1005. For example, the sensing information may be obtained based on a collection period.

The electronic device 101 may record the obtained sensing information 1010 in the first memory 1001. For example, the electronic device 101 may temporarily store the sensing information 1010 in the first memory 1001, which is a volatile memory. Thereafter, in response to detecting that the wireless communication connection established with the server 103 is disconnected or that the state of the ignition switch is changed from ON to OFF, the electronic device 101 may store, in the second memory 1002, the sensing information 1020 recorded in the first memory 1001. For example, the electronic device 101 may store the recorded sensing information 1020 in the second memory 1002, which is a non-volatile memory, in response to disconnection of the wireless communication connection or changing in the state of the ignition switch.

Referring to FIG. 10, the electronic device 101 may transmit the sensing information of the first memory 1001 or the second memory 1002 to the server 103 and may receive a response thereto. In this case, the sensing information transmitted to the server 103 may be periodically transmitted. For example, the sensing information may be transmitted to the server 103 based on a transmission period.

Referring to the foregoing description, FIG. 10 illustrates an example of sensing information obtained through the sensor 1005, but embodiments of the disclosure are not limited thereto. For example, the embodiment of the disclosure may be also applied substantially the same to position information obtained using a communication circuit (e.g., the communication circuit 230 of FIG. 2A) or an image obtained using a camera (e.g., the camera 270 of FIG. 2A).

Figure 11:
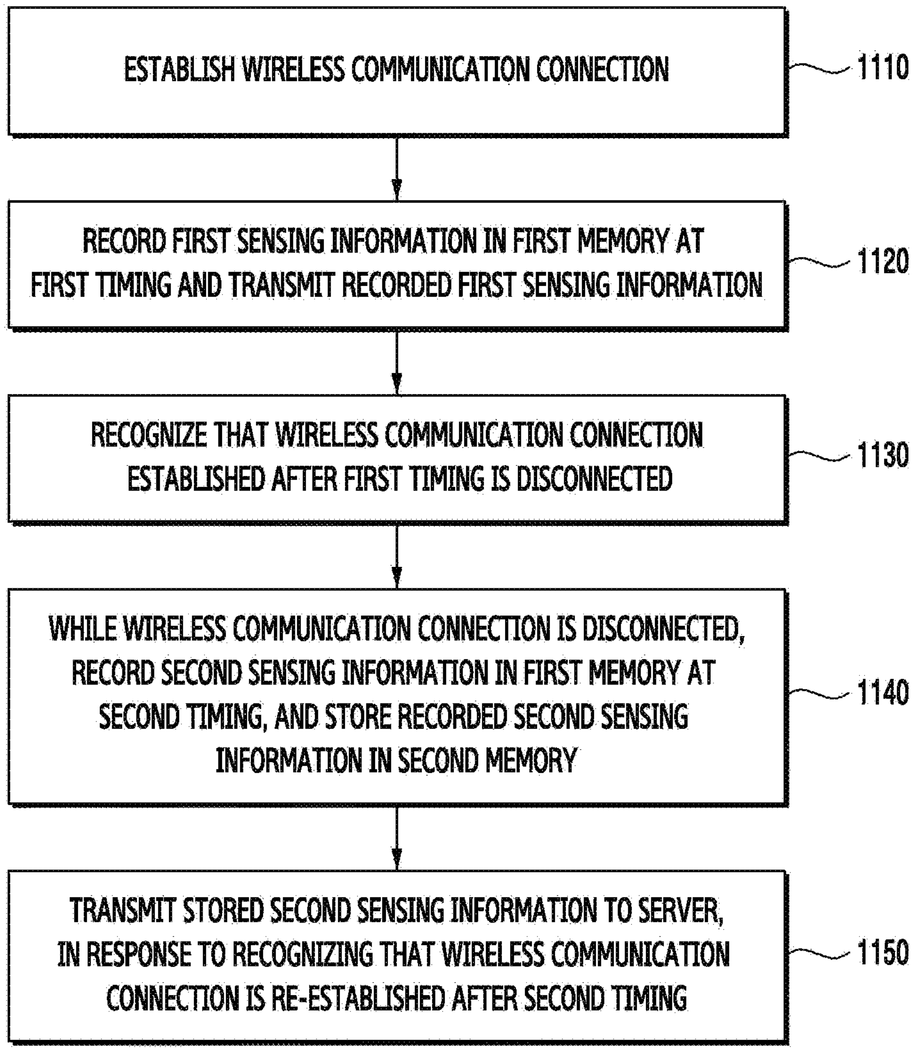
FIG. 11 illustrates an example of a flow of operations as to how an electronic device stores the obtained sensing information and transmits the stored sensing information based on a state of a communication connection, according to an embodiment.

FIG. 11 illustrates an example of an operation flow of a method performed by an electronic device storing obtained sensing information and transmitting the stored sensing information, depending upon to a state of a communication connection, according to an embodiment.

The electronic device 101 of FIG. 11 may include the electronic device 101 of FIG. 1 and the electronic device 101 of FIG. 2A. At least one of operations of FIG. 11 may be performed by the electronic device 101. For example, at least one of the operations may be controlled by the processor 210. Each of the operations of FIG. 11 may be performed sequentially, but may be not necessarily performed sequentially. For example, the sequence of each of the operations may be changed, and at least two operations thereof may be performed in parallel.

According to an embodiment, in operation 1110, the electronic device 101 may establish a wireless communication connection. For example, the electronic device 101 may establish the wireless communication connection with the server 103. For example, the wireless communication connection may be performed based on Wi-Fi, 3G, LTE, or 5G. However, embodiments of the disclosure are not limited thereto.

According to an embodiment, the electronic device 101 may turn on the power before establishing the wireless communication connection. For example, the electronic device 101 may be supplied with the power and turn on the power, based on a user input. For example, the electronic device 101 may perform a booting after the power is turned on. For example, after the booting is completed, the electronic device 101 may transmit, to the server 103, a booting complete message notifying that the booting is completed.

According to an embodiment, the electronic device 101 may initiate collecting sensing information, before establishing the wireless communication connection. For example, the electronic device 101 may collect the sensing information, using an accident occurrence detection sensor (e.g., an acceleration sensor or a gyroscope sensor). For example, the collection may be performed periodically or whenever an event occurs. The collection may be performed based on a collection period. For example, the sensing information may include an acceleration value.

According to an embodiment, the electronic device 101 may collect position information together with the sensing information. For example, the electronic device 101 may collect the position information using communication circuitry. For example, the collection may be performed periodically. For example, the position information may include coordinates based on GPSs.

According to an embodiment, the electronic device 101 may transmit a configuration request message to the server 103. For example, after the wireless communication connection is established, the electronic device 101 may transmit the configuration request message to the server 103. For example, the configuration request message may include at least one of identification information of the electronic device 101, identification information of a USIM embedded in the electronic device 101, or firmware information of the electronic device 101. For example, the identification information of the electronic device 101 may include an international mobile equipment identity (IMEI). For example, the identification information of the US™ may include an integrated circuit card identifier (ICCID). For example, the firmware information may include version information of a program booted in the electronic device 101.

According to an embodiment, in operation 1120, the electronic device 101 may record first sensing information in the first memory 221 at a first timing and may transmit the recorded first sensing information. For example, the electronic device 101 may obtain the first sensing information at the first timing during the collection period. For example, the electronic device 101 may record the obtained first sensing information in the first memory 221. For example, the recording may include temporary storage. For example, the electronic device 101 may transmit the recorded first sensing information to the server 103.

According to an embodiment, in operation 1130, the electronic device 101 may recognize that the wireless communication connection established after the first timing is disconnected.

According to an embodiment, in operation 1140, while the wireless communication connection is disconnected, the electronic device 101 may record second sensing information in the first memory 221 at a second timing, and may store the recorded second sensing information in the second memory 222. For example, the electronic device 101 may obtain the second sensing information at the second timing after the first timing, while the wireless communication connection is disconnected. For example, the electronic device 101 may record the second timing in the first memory 221 and may store the recorded second sensing information in the second memory 222. Since the second memory 222 is a non-volatile memory, the second sensing information may not be deleted (or removed) over time.

According to an embodiment, in operation 1150, the electronic device 101 may transmit the stored second sensing information to the server 103, in response to recognizing that the wireless communication connection is re-established after the second timing. For example, the electronic device 101 may transmit the second sensing information, which is continuous with the first sensing information, to the server 103, based on recognizing the re-establishment.

Referring to the foregoing description, even though the wireless communication connection with the electronic device 101 is temporarily disconnected, the server 103 may receive a set of consecutive sensing information from the electronic device 101. Accordingly, the server 103 may seamlessly provide the vehicle service.

Figure 12:
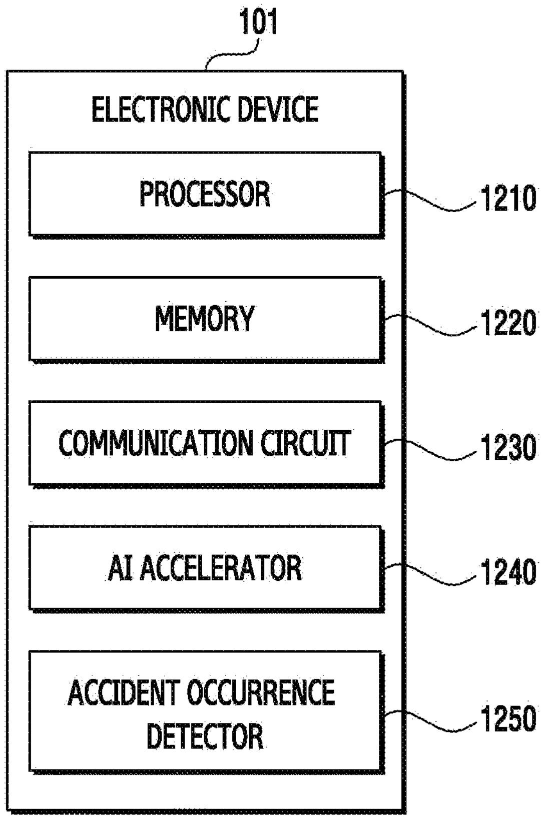
FIG. 12 is a block diagram of an example electronic device for detecting a movement event using an artificial intelligence model, according to an embodiment.

FIG. 12 is a block diagram of an example electronic device for detecting a movement event using an artificial intelligence model, according to an embodiment.

The electronic device 101 of FIG. 12 may be an example of the electronic device 101 of FIG. 2A or the electronic device 101 of FIG. 1. For example, the electronic device 101 may be mounted (or included) in a vehicle.

Referring to FIG. 12, the electronic device 101 may include a processor 1210, a memory 1220, a communication circuit 1230, an AI accelerator 1240, and an accident occurrence detector 1250. For example, the processor 1210 may correspond to the processor 210 of the electronic device 101 of FIG. 2A. For example, the memory 1220 may correspond to the memory 220 of the electronic device 101 of FIG. 2A. For example, the communication circuit 1230 may correspond to the communication circuit 230 of the electronic device 101 of FIG. 2A. For example, the accident occurrence detector 1250 may include the sensor unit 240 or the microphone 295 of the electronic device 101 of FIG. 2A. For example, the accident occurrence detector 1250 may be referred to as an accident occurrence detection sensor or an accident occurrence detection device.

For example, when information detected through at least one of an acceleration sensor, a gyroscope sensor, a barometer, a thermometer, or a microphone is input, the accident occurrence detector 1250 may transmit the input information to the AI accelerator 1240. For example, the electronic device 101 may input, to the AI accelerator 1240, the sensing information (e.g., information detected through at least one of an acceleration sensor, a gyroscope sensor, a barometer, a thermometer, or a microphone) obtained (or output) by the accident occurrence detector 1250. Although not illustrated in FIG. 12, the sensing information output from the accident occurrence detector 1250 may be pre-processed by a preprocessor (not illustrated) before being input to the AI accelerator 1240. The preprocessor may perform preprocessing such as, e.g., removing an error or noise of data, correcting any defect information, tagging data, organizing data, and reconstructing data before the sensing information is input to an artificial intelligence model executed in the AI accelerator 1240.

For example, the AI accelerator 1240 may include a hardware device for improving computing performance required to generate and execute an AI model for identifying a movement (or a movement event) of a vehicle in which the electronic device 101 is mounted. For example, the AI accelerator 1240 may include a circuit specialized for a specific AI task rather than a general processor such as CPU or GPU. Accordingly, the AI accelerator 1240 may process data more quickly and efficiently. For example, the AI accelerator 1240 may include a hardware processor for running a deep learning network. In one embodiment, the AI accelerator 1240 may include a specialized processor for performing inference on the sensing information via a convolution neural network (CNN). In other words, the AI accelerator 1240 may be included in the processor 1210 or may be included in the processor 1210 and the memory 1220.

For example, the sensing information processed by the preprocessor may be fed to a deep learning network run by the AI accelerator 1240. The output of the deep learning network run by the AI accelerator 1240 may be fed to the processor 1210. Intermediate results of the deep learning network run by the AI accelerator 1240 may be fed to the AI accelerator 1240.

Figure 13:
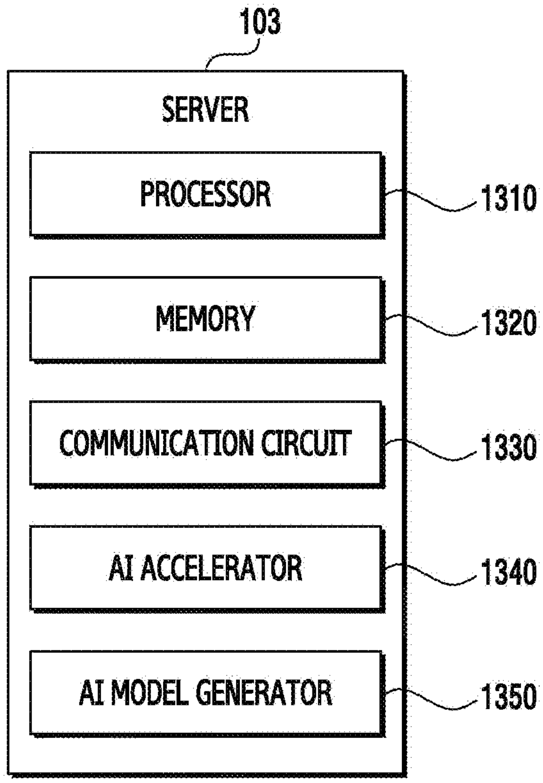
FIG. 13 is a block diagram of an example server for detecting a movement event using an artificial intelligence model, according to an embodiment.

FIG. 13 is a block diagram of an exemplary server for detecting a movement event using an artificial intelligence model, according to an embodiment.

The server 103 of FIG. 13 may be an example of the server 103 of FIG. 3 or the server 103 of FIG. 1. For example, the server 103 may be connected to the electronic device 101 and may provide the vehicle service based on information (or sensing information) received from the electronic device 101.

Referring to FIG. 13, the server 103 may include a processor 1310, a memory 1320, a communication circuit 1330, an AI accelerator 1340, and an AI model generator 1350. For example, the processor 1310 may correspond to the processor 310 of the server 103 of FIG. 3. For example, the memory 1320 may correspond to the memory 320 of the server 103 of FIG. 3. For example, the communication circuit 1330 may correspond to the communication circuit 330 of the server 103 of FIG. 3.

According to an embodiment, the server 103 may generate an artificial intelligence model adapted to infer any movement (or movement event, event, etc.) of the vehicle on which the electronic device 101 is mounted (or included) from sensing information obtained through an accident occurrence detector 1250, and may transmit (or deploy) the generated artificial intelligence model to the electronic device 101.

According to an embodiment, the server 103 may train an artificial intelligence model by using a machine learning algorithm or may use the trained artificial intelligence model. For example, the server 103 may include a plurality of servers (or sub-servers) to perform distributed processing. Alternatively, for example, the server 103 may be implemented as a core network of a communication network. Alternatively, for example, the server 103 may be incorporated as part of the configuration of the electronic device 101 to perform at least some of the AI processing together.

For example, the processor 1310 may control the components of the server 103 to cause the server 103 to generate the artificial intelligence model. For example, the processor 1310 may improve computing performance required for the AI accelerator 1340 to generate a data set for generating and learning the AI model. For example, the AI accelerator 1340 may be implemented as an artificial intelligence model that deals with complex and massive amounts of data in the technical fields such as deep learning, computer vision, natural language processing, and the like. For example, the AI accelerator 1340 may be implemented as TPU, NPU, FPGA, ASIC, or the like.

For example, the AI model generator 1350 may train an artificial intelligence model (or an artificial neural network of the artificial intelligence model), using the data set. The artificial intelligence model may be utilized being mounted on the server 103, or may be utilized being mounted on an external device such as the electronic device 101. The artificial intelligence model may be implemented by hardware, software, or a combination of hardware and software. When part or all of the artificial intelligence model is implemented as software, one or more instructions configuring the artificial intelligence model may be stored in the memory 1320. The processor 1310 may infer a resultant value with respect to new input data using the artificial intelligence model, and may generate a response or a control command based on the inferred resultant value.

Referring to the foregoing description, the server 103 may train the artificial intelligence model (or the artificial neural network) to detect a correct movement event of the vehicle, according to the following steps:

(1) Collecting datasets of various automobile crash scenarios, including frontal crashes, side crashes, rear crashes, rollovers, or the like, occurring in a variety of vehicles and environments;

(2) Data labelling based on the severity and type of the traffic accident, and the location and time of the accident occurred;

(3) Data pre-processing for extracting the features of sensing information obtained through the accident occurrence detector 1250 of the electronic device 101;

(4) Designing a neural network architecture capable of accurately and efficiently classifying vehicle movement events through learning from the extracted features;

(5) Training the neural network from the data using an appropriate optimization method, such as, e.g., stochastic gradient descent, and using a regularizing technique, such as e.g., dropout, to prevent overfitting and improve generalization;

(6) Evaluating performance of the artificial intelligence model (or artificial neural network) on unseen data using metrics such as, e.g., accuracy, precision, recall, and F1-score, and fine-tuning network parameters to optimize results; and (7) Deploying the learned optimal artificial intelligence model (or artificial neural network) to the electronic device 101, and performing a test for the electronic device 101 in a real-world scenario to ensure reliability and safety.

According to an embodiment, the AI accelerator 1240 of the electronic device 101 may use various frameworks to execute the AI model (or the artificial neural network) for identifying (inferring) a movement event of the vehicle. Such a framework may utilize hardware of the electronic device 101 and minimize usage and power consumption of the memory 1220, thereby optimizing the performance of the electronic device 101.

According to an embodiment, the server 103 may learn the models by using a large amount of data from collision scenarios in various environments of various vehicles, for more accurate identification of the movement event of the vehicle. For example, the data set for training the model may include data sets obtained under various conditions and in diverse types of collision directions (e.g., front, rear, side, rollover, etc.) that may occur for each type of vehicle (e.g., sedan, sport utility vehicle (SUV), truck, bus, etc.). Through the artificial intelligence model trained based on the data set, the electronic device 101 may recognize a pattern indicating a collision from the obtained sensing information and identify a movement event of the vehicle from the recognized pattern. The identifying of the movement event may be referred to as detecting a level of the event depending upon the impact.

According to an embodiment, the electronic device 101 may use Core ML™ TensorFlow™, PyTorch™, CNTK™, MXNet™, or the like, as a framework for learning an artificial intelligence model (or artificial neural network). However, the embodiments of the disclosure are not limited thereto. For example, the electronic device 101 may use a framework capable of easily and efficiently performing processes such as, e.g., collecting and pre-processing data, learning and evaluating a model, performing a prediction, improving its result, and so on. For example, the framework may include a machine learning framework that is a set of tools and libraries for developing and executing machine learning models that can be used in various languages and platforms.

Figure 14:
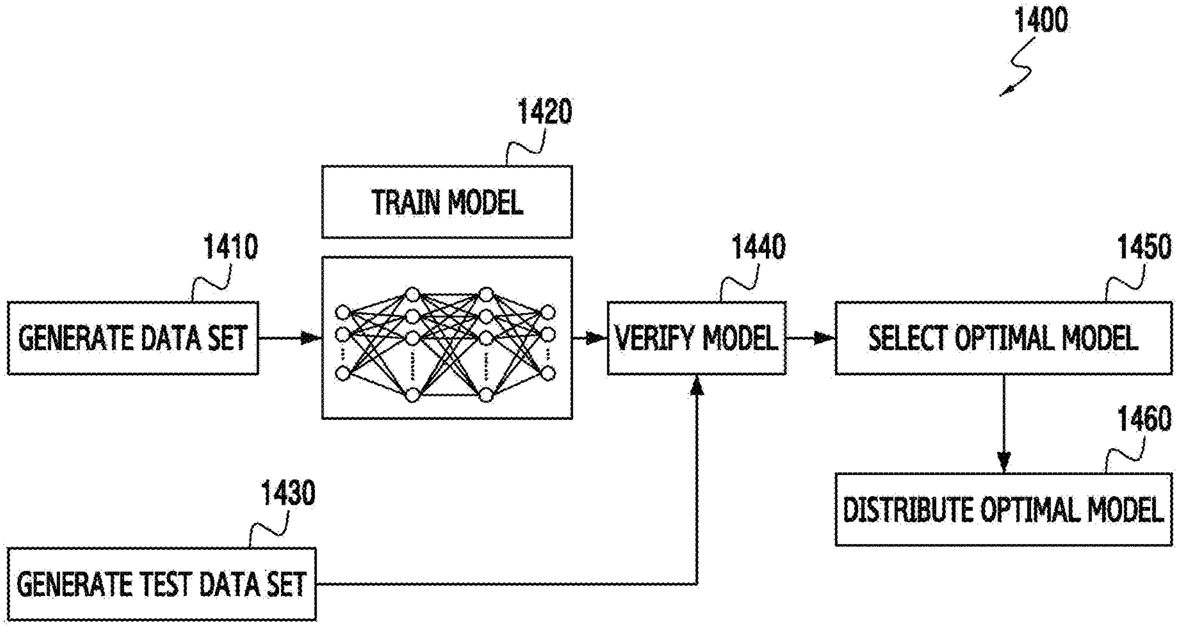
FIG. 14 illustrates an example of a method for training an artificial intelligence model for detecting a movement event, according to an embodiment.

FIG. 14 illustrates an example of a method of training an artificial intelligence model for detecting a movement event, according to an embodiment.

Referring to FIG. 14, it is illustrated an example 1400 of a method of the server 103 learning (or generating) and distributing an artificial intelligence model for detecting the movement event.

Referring to the example 1400, in operation 1410, the server 103 may generate a data set. For example, the server 103 may generate a training data set to be used to train the artificial intelligence model for detecting the movement event. For example, the training data set may include a data set for vehicle collision scenarios such as, e.g., front collision, side collision, rear collision, rollover and so on that might occur in an environment with various vehicles.

According to an embodiment, in operation 1420, the server 103 may train the artificial intelligence model. For example, the server 103 may train the artificial intelligence model using the training data set.

According to an embodiment, in operation 1430, the server 103 may generate a test data set for verifying a learning state of the trained artificial intelligence model. For example, the test data set may be referred to as a reference data set. For example, the test data set may be mapped to the training data set. For example, when the training data set is input data, the test data set may be output data. According to an embodiment, in operation 1440, the server 103 may perform a verification of the artificial intelligence model, based on the test data set.

According to an embodiment, in operation 1450, the server 103 may select an optimal model. For example, the server 103 may select the optimal model from among a plurality of artificial intelligence models generated by repeating the operations 1410 to 1440. For example, the optimal model may be a model having the best verification result of the plurality of artificial intelligence models. For example, the result of the verification may include a similarity between the input and the output.

According to an embodiment, in operation 1460, the server 103 may distribute the optimal model. For example, the server 103 may transmit the selected optimal model to the electronic device 101. For example, the electronic device 101 may identify a movement event of the vehicle in which the electronic device 101 is mounted, based on the received artificial intelligence model.

Figure 15:
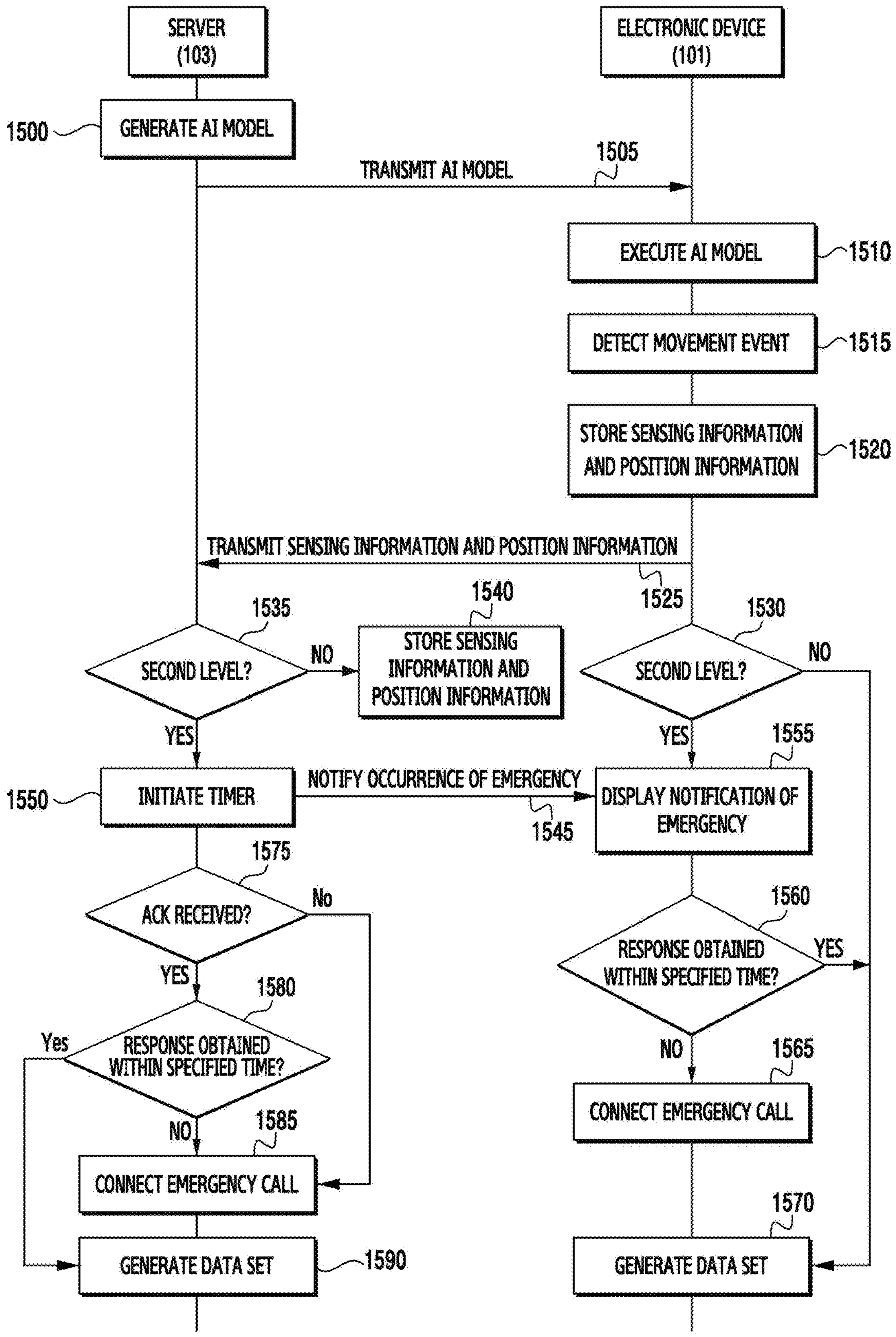
FIG. 15 illustrates an example of a signal flow between an electronic device and a server for detecting a movement event using an artificial intelligence model and providing an emergency notification service based on the detected movement event, according to an embodiment.

FIG. 15 illustrates an example of a signal flow between an electronic device and a server, for detecting a movement event using an artificial intelligence model and providing an emergency notification service based on the detected movement event, according to an embodiment.

Referring to FIG. 15, it is illustrated an example of a method of providing the emergency notification service among the vehicle services, but embodiments of the disclosure are not limited thereto. The server 103 of FIG. 15 may be an example of the server 103 of FIG. 1, the server 103 of FIG. 3, or the server 103 of FIG. 13. The electronic device 101 of FIG. 15 may be an example of the electronic device 101 of FIG. 1, the electronic device 101 of FIG. 2A, or the electronic device 101 of FIG. 12.

In the example of FIG. 15, according to an embodiment, in operation 1500, the server 103 may generate an artificial intelligence model. For example, the server 103 may generate the artificial intelligence model, by using the AI accelerator 1340 and the AI model generator 1350. Detailed description related thereto may refer to the above description of FIGS. 13 and 14.

According to an embodiment, in operation 1505, the server 103 may transmit the artificial intelligence model. For example, the server 103 may distribute the generated artificial intelligence model to the electronic device 101 connected to the server 103. For example, the distributed artificial intelligence model may be an optimal artificial intelligence model.

According to an embodiment, in operation 1510, the electronic device 101 may execute the artificial intelligence model. For example, the artificial intelligence model may be used to detect a movement event (or event) of a vehicle on which the electronic device 101 is mounted (or included).

According to an embodiment, in operation 1515, the electronic device 101 may detect a movement event. For example, the electronic device 101 may detect the movement event of the vehicle, based on the executed artificial intelligence model. For example, the electronic device 101 may input sensing information obtained through a sensor (or an accident occurrence detector 1250) of the electronic device 101 to the artificial intelligence model, and may detect the movement event based on an output of the artificial intelligence model.

According to an embodiment, when obtaining the sensing information, the electronic device 101 may obtain position information of the electronic device 101. For example, the electronic device 101 may obtain the position information using a communication circuit (e.g., the communication circuit 230 or the communication circuit 1230).

According to an embodiment, in operation 1520, the electronic device 101 may store the sensing information and the position information. For example, the electronic device 101 may record the sensing information and the position information in the first memory 221, and may store the recorded sensing information and position information in the second memory 222. In this case, the storing of the sensing information and the position information may be for use as a training data set.

According to an embodiment, in operation 1525, the electronic device 101 may transmit the sensing information and the position information to the server 103. In FIG. 15, it is illustrated that the operation 1520 and the operation 1525 are performed after the operation 1515, but embodiments of the disclosure are not limited thereto. For example, the electronic device 101 may perform the operation 1520 or the operation 1525 together with the operation 1515.

According to an embodiment, in operation 1530, the electronic device 101 may determine whether the level of the detected movement event is a second level. For example, the electronic device 101 may determine whether the level of the movement event is the second level (or crash event), based on the artificial intelligence model. In the operation 1530, when the level is the second level, it may perform operation 1555. In contrast thereto, in the operation 1530, when the level is the first level (or a non-crash event) lower than the second level, it may perform operation 1570.

Further, according to an embodiment, in operation 1535, the server 103 may determine whether the movement event of the vehicle on which the electronic device 101 is mounted (or included) is at the second level. For example, the server 103 may determine whether the movement event is at the second level, using the artificial intelligence model, and using the sensing information and the position information received in operation 1525. In the operation 1535, when the level is at the second level, operation 1550 may be performed. Alternatively, in the operation 1535, when the level is the first level lower (or a non-crash event) than the second level, operation 1540 may be performed.

According to an embodiment, in the operation 1540, the server 103 may store the sensing information and the position information. For example, the sensing information and the position information may be used to control the electronic device 101 (or the vehicle).

According to an embodiment, in operation 1545, the server 103 may notify occurrence of an emergency. For example, in response to determining that the movement event is at the second level, the server 103 may transmit a message for notifying the occurrence of the emergency to the electronic device 101.

According to an embodiment, in operation 1550, the server 103 may initiate a timer. For example, the timer may be started as the message is transmitted. For example, the timer may be a timer for recognizing that a response to the message is received from the electronic device 101.

According to an embodiment, in operation 1555, the electronic device 101 may display a notification of emergency. For example, the electronic device 101 may display a visual object or an executable object for notification of the emergency. For example, the visual object or the executable object may be displayed through a display (e.g., the display 260 of FIG. 2A) of the electronic device 101.

Referring to the example of FIG. 15, the server 103 or the electronic device 101 may determine whether the movement event is at the second level. When the server 103 determines whether the movement event is at the second level and then transmits a message for notifying occurrence of the emergency, the electronic device 101 may display the visual object or the executable object in response to the message. Alternatively, for example, when the electronic device 101 directly determines whether the movement event is at the second level, the electronic device 101 may display the visual object or the executable object in response to the determination. Alternatively, for example, when the server 103 determines whether the movement event is at the second level, and transmits the message for notifying of the occurrence of the emergency, and the electronic device 101 directly determines whether the movement event is at the second level, the electronic device 101 may display the visual object or the executable object, based on a quick timing between the timing at which the message is received and the timing the electronic device 101 directly determined.

Although not illustrated in FIG. 15, when receiving the message for notifying the occurrence of the emergency in the operation 1545, the electronic device 101 may transmit acknowledgement (ACK) for the message to the server 103.

According to an embodiment, in operation 1560, the electronic device 101 may determine whether a response is obtained within a specified time. For example, the electronic device 101 may determine whether the response of the user is obtained with respect to the visual object or the executable object displayed. For example, the user's response may include a voice, a touch input, or a gesture. In the operation 1560, when the electronic device 101 obtains the response within the specified time, operation 1570 may be performed. In contrast, in the operation 1560, when the electronic device 101 fails to obtain the response within the specified time, operation 1565 may be performed.

According to an embodiment, in operation 1565, the electronic device 101 may perform an emergency call connection. For example, the electronic device 101 may perform the emergency call connection directly or indirectly through an external electronic device (e.g., the user terminal device 105 of FIG. 1). In other words, as the electronic device 101 recognizes that the user's biometric reaction is not generated, after the second level of event occurred, the electronic device 101 may perform the emergency call connection.

According to an embodiment, in operation 1570, the electronic device 101 may generate a data set. For example, the electronic device 101 may not perform the emergency call connection when it is detected that the electronic device 101 is at the first level or when the response of the user is obtained within the specified time even in a case of the electronic device 101 being at the second level. Then, the electronic device 101 may generate a data set (or a training data set) for training the artificial intelligence model from the sensing information and the position information used to detect the second level. Thereafter, the data set may be fed to the artificial intelligence model.

According to an embodiment, in operation 1575, the server 103 may determine whether the ACK is received. For example, the server 103 may determine whether the ACK is received from the electronic device 101. For example, the server 103 may determine whether the ACK has been received from the electronic device 101 before the timer expires. In the operation 1575, when the ACK is received before the timer expires, the server 103 may perform the operation 1575. In contrast thereto, in the operation 1575, when the ACK has not been received before the timer expires, the server 103 may perform operation 1585. For example, when the ACK has not been received before the timer expires, the server 103 may determine that the wireless communication connection between the electronic device 101 and the server 103 is disconnected or that the electronic device 101 is unable to transmit the ACK, and may perform the operation 1585.

According to an embodiment, in operation 1580, the server 103 may determine whether the response is obtained within the specified time. The server 103 may receive, from the electronic device 101, a signal (or a message) indicating whether the response has been obtained by the electronic device 101 within the specified time. Accordingly, the server 103 may determine whether the response is obtained within the specified time. For example, the user's response may include a voice, a touch input, or a gesture.

In operation 1580, in case that the electronic device 101 determines that it has obtained the response within the specified time, the server 103 may perform operation 1590. In contrast, in operation 1580, when it is determined that the electronic device 101 has not obtained the response within the specified time, the server 103 may perform operation 1585.

According to an embodiment, in operation 1585, the server 103 may perform the emergency call connection. For example, the server 103 may perform the emergency call connection directly or indirectly through an external electronic device (e.g., the user terminal device 105 of FIG. 1). In other words, as the server 103 recognizes that the biometric reaction of the user is not generated after the second level of event occurred, the server 103 may perform the emergency call connection.

According to an embodiment, in operation 1590, the server 103 may generate a data set. For example, the server 103 may not perform the emergency call connection, when it detects that it is at the first level or when the electronic device 101 obtains the response of the user within the specified time even in a case of the electronic device 101 being at the second level. Then, a data set (or a training data set) for training the artificial intelligence model may be generated from the sensing information and the position information used to detect the second level. Thereafter, the data set may be fed to the artificial intelligence model.

According to the foregoing description, the artificial intelligence model executed and stored in the electronic device 101 may be stored in the electronic device 101 even though the wireless communication connection with the server 103 is disconnected, and thus the electronic device 101 may stably provide a function of detecting the movement event.

As described above, an electronic device may comprise memory storing instructions and including a first memory and a second memory. The electronic device may comprise a sensor. The electronic device may comprise a communication circuit. The electronic device may comprise a processor. The instructions may, when executed by the processor, cause the electronic device to establish wireless communication connection by using the communication circuit. The instructions may, when executed by the processor, cause the electronic device to record in the first memory first sensing information, which is obtained through the sensor at first timing, including an acceleration of a vehicle in which the electronic device is equipped and transmit, to a server providing a service associated with the vehicle, the recorded first sensing information. The instructions may, when executed by the processor, cause the electronic device to recognize that the established wireless communication connection is disconnected after the first timing. The instructions may, when executed by the processor, cause the electronic device to record in the first memory second sensing information, which is obtained through the sensor at second timing, including an acceleration of the vehicle while the wireless communication connection is disconnected and store the recorded second sensing information in the second memory. The instructions may, when executed by the processor, cause the electronic device to transmit, to the server, the stored second sensing information in response to recognizing that the wireless communication connection is reestablished after the second timing.

According to an embodiment, the instructions may, when executed by the processor, cause the electronic device to identify that a power of the electronic device is changed from an off state to an on state. The instructions may, when executed by the processor, cause the electronic device to execute a booting of the electronic device in response to the identifying the on state. The instructions may, when executed by the processor, cause the electronic device to initiate collection of sensing information representing an acceleration of the vehicle according to a designated time period by using the sensor after the booting is finished. The sensing information collected according to the designated time period may include the first sensing information and the second sensing information.

According to an embodiment, the wireless communication connection may be established based on at least one of a long term evolution (LTE) communication scheme, a wireless fidelity (Wi-Fi) communication scheme, or a satellite communication scheme.

According to an embodiment, the first memory may include volatile memory. The second memory may include non-volatile memory. The first sensing information may be deleted from the first memory after the first sensing information is transmitted to the server.

According to an embodiment, the instructions may, when executed by the processor, cause the electronic device to transmit, to the server, a configuration request message based on the established wireless communication connection. The instructions may, when executed by the processor, cause the electronic device to receive, from the server, a configuration response message in response to the configuration request message. The configuration request message may include at least one of identification information of the electronic device, identification information of a universal subscriber identity module, or firmware information of the electronic device. The configuration response message may include at least one of sensitivity of an acceleration sensor included in the sensor, a length of a transmission period for transmission of sensing information, or reference values for detecting an event.

According to an embodiment, the instructions may, when executed by the processor, cause the electronic device to transmit, to the server together with the first sensing information, first position information of the electronic device calculated based on a first signal received at the first timing through the communication circuit. The instructions may, when executed by the processor, cause the electronic device to transmit, to the server together with the second sensing information, second position information of the electronic device calculated based on a second signal received at the second timing through the communication circuit.

According to an embodiment, the instructions may, when executed by the processor, cause the electronic device to record in the first memory a value, obtained by using the sensor, representing an acceleration of the vehicle at a timing when an impact from outside occurs while the wireless communication connection is established. The instructions may, when executed by the processor, cause the electronic device to determine whether the value is greater than or equal to a first reference value. The instructions may, when executed by the processor, cause the electronic device to determine whether the value is less than a second reference value greater than the first reference value in case that the value is greater than or equal to the first reference value.

According to an embodiment, the instructions may, when executed by the processor, cause the electronic device to transmit, to the server at another timing after the timing, a set of sensing information collected according to the designated time period in a designated time length including the timing in case that the value is greater than or equal to the first reference value and less than the second reference value.

According to an embodiment, the instructions may, when executed by the processor, cause the electronic device to refrain from obtaining of another value representing an acceleration of the vehicle at a timing when another impact from the outside occurs in the designated time length.

According to an embodiment, the instructions may, when executed by the processor, cause the electronic device to transmit, to the server, indication information representing that the impact occurs in response to determining that the value is greater than or equal to the second reference value. The instructions may, when executed by the processor, cause the electronic device to transmit, to the server at another timing after reference length from the timing, a video, which is recorded with respect to outside of the vehicle, having a designated time length including the timing. The indication information includes identification information of the electronic device and a time when the impact occurs.

According to an embodiment, the instructions may, when executed by the processor, cause the electronic device to transmit, to the server after transmitting the video at the another timing, a set of sensing information collected according to the designated time period in the designated time length including the timing.

According to an embodiment, the instructions may, when executed by the processor, cause the electronic device to transmit, to the server, indication information representing that the impact occurs in response to determining that the value is greater than or equal to the second reference value, wherein the indication information includes identification information of the electronic device and a time when the impact occurs. The instructions may, when executed by the processor, cause the electronic device to detect that a state of an ignition switch of the electronic device is changed from an on state to an off state after transmitting the indication information. The instructions may, when executed by the processor, cause the electronic device to store in the second memory the recorded value in response to detecting that the state of the ignition switch is changed to the off state. The instructions may, when executed by the processor, cause the electronic device to execute another booting of the electronic device in response to that the state of the ignition switch is changed from the off state to the on state. The instructions may, when executed by the processor, cause the electronic device to transmit, to the server, a video, which is recorded with respect to outside of the vehicle, having a designated time length including the timing after finishing the another booting. The instructions may, when executed by the processor, cause the electronic device to transmit, to the server after transmitting the video, a set of sensing information collected according to the designated time period in the designated time length including the timing. The set may include the recorded value.

According to an embodiment, the instructions may, when executed by the processor, cause the electronic device to transmit, to the server, indication information representing that the impact occurs in response to determining that the value is greater than or equal to the second reference value. The indication information may include identification information of the electronic device and a time when the impact occurs. The instructions may, when executed by the processor, cause the electronic device to transmit, to the server, a video, which is recorded with respect to outside of the vehicle, having a designated time length including the timing after transmitting the indication information. The instructions may, when executed by the processor, cause the electronic device to detect that a state of an ignition switch of the electronic device is changed from an on state to an off state after transmitting the video. The instructions may, when executed by the processor, cause the electronic device to store in the second memory the recorded value in response to detecting that the state of the ignition switch is changed to the off state. The instructions may, when executed by the processor, cause the electronic device to execute another booting of the electronic device in response to that the state of the ignition switch is changed from the off state to the on state. The instructions may, when executed by the processor, cause the electronic device to transmit, to the server after finishing the another booting, a set of sensing information collected according to the designated time period in the designated time length including the timing. The set may include the recorded value.

According to an embodiment, a comparison between the value and the first reference value and a comparison between the value and the second reference value may be performed based on an artificial intelligent model stored in the second memory, the artificial intelligent model learned with respect to acceleration information collected through the sensor and the vehicle in which the electronic device is equipped.

As described, a method performed by an electronic device may comprise establishing wireless communication connection. The method may comprise recording in a first memory of the electronic device first sensing information, which is obtained at first timing, including an acceleration of a vehicle in which the electronic device is equipped and transmitting, to a server providing a service associated with the vehicle, the recorded first sensing information. The method may comprise recognizing that the established wireless communication connection is disconnected after the first timing. The method may comprise recording in the first memory second sensing information, which is obtained at second timing, including an acceleration of the vehicle, while the wireless communication connection is disconnected and storing the recorded second sensing information in a second memory of the electronic device. The method may comprise transmitting, to the server, the stored second sensing information, in response to recognizing that the wireless communication connection is reestablished after the second timing.

According to an embodiment, the method may comprise identifying that a power of the electronic device is changed from an off state to an on state. The method may comprise executing a booting of the electronic device in response to the identifying the on state. The method may comprise initiating collection of sensing information representing an acceleration of the vehicle according to a designated time period after the booting is finished. The sensing information collected according to the designated time period may include the first sensing information and the second sensing information.

According to an embodiment, the wireless communication connection may be established based on at least one of a long term evolution (LTE) communication scheme, a wireless fidelity (Wi-Fi) communication scheme, or a satellite communication scheme.

According to an embodiment, the first memory may include volatile memory. The second memory may include non-volatile memory. The first sensing information may be deleted from the first memory after the first sensing information is transmitted to the server.

According to an embodiment, the method may comprise transmitting, to the server, a configuration request message based on the established wireless communication connection. The method may comprise receiving, from the server, a configuration response message in response to the configuration request message. The configuration request message may include at least one of identification information of the electronic device, identification information of a universal subscriber identity module, or firmware information of the electronic device. The configuration response message may include at least one of sensitivity of an acceleration sensor included in the sensor, a length of a transmission period for transmission of sensing information, or reference values for detecting an event.

According to an embodiment, the method may comprise transmitting, to the server together with the first sensing information, first position information of the electronic device calculated based on a first signal received at the first timing through the communication circuit. The method may comprise transmitting, to the server together with the second sensing information, second position information of the electronic device calculated based on a second signal received at the second timing through the communication circuit.

The above-described devices may be implemented as hardware components, software components, and/or a combination of hardware components and software components. For example, the devices and components described in the embodiments may be implemented using one or more general-purpose computers or special-purpose computers, such as a processor, a controller, an arithmetic logic unit (ALU), a digital signal processor, a microcomputer, a field programmable gate array (FPGA), a programmable logic unit (PLU), a microprocessor, or any other device capable of executing and responding to instructions. The processing device may perform an operating system (OS) and one or more software applications performed on the operating system. Further, the processing device may access, store, manipulate, process, and generate data in response to the execution of the software. For convenience of understanding, it may be described that one processing device is used. However, those skilled in the art may understand that the processing device may include a plurality of processing elements and/or a plurality of types of processing elements. For example, the processing device may include a plurality of processors or one processor and one controller. In addition, other processing configurations such as parallel processors are also possible.

The software may include a computer program, a code, an instruction, or a combination of one or more thereof, and may configure a processing device to operate as desired or may independently or collectively instruct the processing device. Software and/or data may be interpreted by a processing device or may be embodied in any type of machine, component, physical device, computer storage medium, or device to provide a command or data to the processing device. Software may be distributed on a networked computer system and stored or executed in a distributed manner. Software and data may be stored in one or more computer-readable recording media.

The method according to an embodiment of the disclosure may be implemented in the form of program commands executable by various computer means and recorded on a computer-readable medium. In this case, the medium may be a persistent storage of a computer-executable program, or it may be a temporary storage for execution or download. Further, the medium may be various recording means or storage means in which a single piece of hardware or a plurality of pieces of hardware are combined, and the medium is not limited to a medium directly connected to a computer system, and may be distributed on a network. Examples of the medium may include a magnetic medium such as a hard disk, a floppy disk, and a magnetic tape, an optical recording medium such as a compact disc read only memory (CD-ROM) and a digital versatile disc (DVD), a magneto-optical medium such as a floptical disk, and a read only memory (ROM), a random access memory (RAM), a flash memory, etc. configured to store program instructions. Further, examples of other media include recording media or storage media managed by an application store that distributes applications, a site that supplies or distributes various other software, a server, and the like.

As described above, although the embodiments have been described with reference to limited embodiments and drawings, various modifications and modifications may be made from the above description by those skilled in the art. For example, even if the described techniques are performed in a different order from the described method, and/or components such as the described system, structure, device, circuit, etc. are combined or combined in a different form from the described method, or are replaced or substituted by other components or equivalents, appropriate results may be achieved.

Therefore, other implementations, other embodiments, and those equivalent to the scope of the patent claim also fall within the scope of the patent claim to be described later. According to an embodiment, a method according to various embodiments of the disclosure may be included and provided in a computer program product. Computer program products are commodities and can be traded between sellers and buyers. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar way as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:

memory storing instructions and including a first memory and a second memory;

a sensor;

an ignition switch;

a camera;

a communication circuit; and a processor, wherein the instructions, when executed by the processor, cause the electronic device to:

establish wireless communication connection with a server by using the communication circuit;

while the wireless communication connection with the server is established, identify that an impact has occurred to a vehicle, based on a value representing acceleration of the vehicle, obtained through the sensor, wherein the electronic device is disposed in the vehicle;

recognize that a state of the ignition switch of the electronic device is changed from an on state to an off state caused by the impact;

while the state of the ignition switch is turned off:

record sensing information obtained through the sensor and video information obtained through the camera in the first memory, and store the sensing information and the video information recorded in the first memory in the second memory;

based on a level of the impact determined based on the value representing the acceleration of the vehicle being a first level:

in response to recognizing that the ignition switch is turned on, transmit the sensing information stored in the second memory to the server, and refrain from transmitting the video information stored in the second memory to the server; and based on the level of the impact determined based on the value representing the acceleration of the vehicle being a second level:

in response to recognizing that the ignition switch is turned on, transmit both the sensing information and the video information stored in the second memory to the server.

2. The electronic device of claim 1, wherein the instructions, when executed by the processor, cause the electronic device to:

wait for a designated time interval from a timing that the impact is detected, and refrain from identifying other impacts that occurred during the designated time interval.

3. The electronic device of claim 1, wherein the wireless communication connection is established based on at least one of a long term evolution (LTE) communication scheme, a wireless fidelity (Wi-Fi) communication scheme, or a satellite communication scheme.

4. The electronic device of claim 1, wherein the first memory includes volatile memory, wherein the second memory includes non-volatile memory, and wherein the sensing information and the video information are deleted from the first memory after the sensing information and the video information are transmitted to the server.

5. The electronic device of claim 1, wherein the instructions, when executed by the processor, cause the electronic device to:

transmit, to the server, a configuration request message based on the established wireless communication connection; and receive, from the server, a configuration response message in response to the configuration request message, wherein the configuration request message includes at least one of identification information of the electronic device, identification information of a universal subscriber identity module, or firmware information of the electronic device, and wherein the configuration response message includes at least one of sensitivity of an acceleration sensor included in the sensor, a length of a transmission period for transmission of the sensing information and the video information, or reference values for detecting an event.

6. The electronic device of claim 1, wherein the instructions, when executed by the processor, cause the electronic device to:

transmit, to the server, position information of the electronic device calculated based on a signal received from at least one satellite through the communication circuit.

7. The electronic device of claim 1, wherein the instructions, when executed by the processor, cause the electronic device to:

identify that the impact has occurred in the vehicle based on the value being greater than or equal to a first reference value;

based on the value being greater than or equal to the first reference value and less than or equal to a second reference value, determine the level of the impact as the first level; and based on the value being greater than or equal to the second reference value, determine the level of the impact as the second level.

8. The electronic device of claim 1, wherein the instructions, when executed by the processor, cause the electronic device to:

transmit, to the server, indication information representing that the impact has occurred, based on the level of the impact determined based on the value representing the acceleration of the vehicle being the second level, wherein the indication information includes identification information of the electronic device and a time when the impact occurs.

9. The electronic device of claim 8, wherein the identification information of the electronic device includes international mobile equipment identity (IMEI).

10. The electronic device of claim 1, wherein the electronic device includes a display, and wherein the instructions, when executed by the processor, cause the electronic device to:

based on the level of the impact being determined to the second level, display, through the display, an emergency situation notification.

11. The electronic device of claim 10, wherein the instructions, when executed by the processor, cause the electronic device to:

obtain a response of a user with respect to the emergency situation notification on the display, wherein the response includes voice, touch input, or gestures.

12. The electronic device of claim 11, wherein the instructions, when executed by the processor, cause the electronic device to:

determine whether the response of the user is received within a designated time interval, and in accordance with determination that the responses are not received, perform an emergency call connection.

13. The electronic device of claim 1, wherein the instructions, when executed by the processor, cause the electronic device to:

in response to that the state of the ignition switch is changed from the off state to the on state, execute a booting of the electronic device; and transmit a booting complete message to the server informing the server that the booting is completed.

14. The electronic device of claim 1, wherein the instructions, when executed by the processor, cause the electronic device to:

determine, based on the value representing the acceleration of the vehicle, the level of the impact using an artificial intelligent model stored in the second memory and trained through the sensing information collected through the sensors over a designated time period.

15. A method performed by an electronic device comprising:

establishing wireless communication connection with a server;

while the wireless communication connection with the server is established, identifying that an impact has occurred to a vehicle, based on a value representing an acceleration of the vehicle equipped with an electronic device, obtained through a sensor;

recognizing that a state of an ignition switch of the electronic device is changed from an on state to an off state caused by an impact;

while the state of the ignition switch is turned off:

recording sensing information through the sensor and video information through a camera in a first memory, and storing the sensing information and the video information recorded in the first memory in a second memory;

based on a level of the impact determined based on the value representing acceleration of the vehicle being a first level:

in response to recognizing that the ignition switch is turned on, transmitting the sensing information stored in the second memory to the server and refraining from transmitting the video information stored in the second memory to the server; and based on the level of the impact determined based on the value representing the acceleration of the vehicle being a second level:

in response to recognizing that ignition switch is turned on, transmitting both the sensing information and the video information stored in the second memory to the server, wherein the electronic device comprises the first memory, the second memory, the sensor, the ignition switch and the camera.

16. The method of claim 15, the method comprising:

waiting for a specified time interval from a timing that the impact is detected; and refraining from identifying other impacts that occurred during the specified time interval.

17. The method of claim 15, wherein the wireless communication connection is established based on at least one of a long term evolution (LTE) communication scheme, a wireless fidelity (Wi-Fi) communication scheme, or a satellite communication scheme.

18. The method of claim 15, wherein the first memory includes volatile memory, wherein the second memory includes non-volatile memory, and wherein the sensing information and the video information are deleted from the first memory after the sensing information and the video information are transmitted to the server.

19. The method of claim 15, the method comprising:

transmitting, to the server, a configuration request message based on the established wireless communication connection; and receiving, from the server, a configuration response message in response to the configuration request message, wherein the configuration request message includes at least one of identification information of the electronic device, identification information of a universal subscriber identity module, or firmware information of the electronic device, and wherein the configuration response message includes at least one of sensitivity of an acceleration sensor included in the sensor, a length of a transmission period for transmission of the sensing information and the video information, or reference values for detecting an event.

20. The method of claim 15, the method comprising:

transmitting, to the server, position information of the electronic device calculated based on signal received from at least one satellite through the communication circuit.

* * * * *